(12) United States Patent
Takahashi et al.

(10) Patent No.: US 6,535,661 B2
(45) Date of Patent: Mar. 18, 2003

(54) OPTICAL SIGNAL PROCESSING METHOD AND OPTICAL SIGNAL PROCESSING APPARATUS

(75) Inventors: Ryo Takahashi, Kanagawa (JP); Tatsushi Nakahara, Kanagawa (JP); Hirokazu Takenouchi, Kanagawa (JP); Hiroshi Yoshimura, Kanagawa (JP); Hiroyuki Suzuki, Kanagawa (JP); Hiroki Itoh, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 28 days.

(21) Appl. No.: 09/843,171

(22) Filed: Apr. 24, 2001

(65) Prior Publication Data

US 2002/0012492 A1 Jan. 31, 2002

(30) Foreign Application Priority Data

Apr. 26, 2000 (JP) ......................................... 2000-125516
Aug. 31, 2000 (JP) ......................................... 2000-262115

(51) Int. Cl.⁷ ............................. G02B 6/26; G02B 6/42
(52) U.S. Cl. ............................. 385/15; 385/14; 385/24; 359/109; 359/140
(58) Field of Search .......................... 385/14, 15, 24, 385/27, 39, 46–52, 147; 359/109, 127, 152, 179, 188, 195, 140, 158

(56) References Cited

U.S. PATENT DOCUMENTS

| | | | |
|---|---|---|---|
| 5,032,010 A | * | 7/1991 | Su ........................... 359/241 |
| 5,297,273 A | * | 3/1994 | Goutzoulis et al. ......... 714/742 |
| 5,528,389 A | * | 6/1996 | Nuss ............................. 359/4 |
| 5,535,032 A | * | 7/1996 | Böttle ........................ 359/140 |
| 6,369,937 B1 | * | 4/2002 | Verber et al. ............... 359/328 |

FOREIGN PATENT DOCUMENTS

EP 0974888 A1 * 1/2000

OTHER PUBLICATIONS

Ema, K, Kuwata–Gonokami, M., Shimizu, F., "All–optical sub–Tbits/s serial–to–parallel conversion using excitonic giant nonlinearity," *Applied Physics Letters* vol. 59, No. 22, No. 25, 1991. pp. 2799–2801.

Ishi, J., Kunugita, H., Ema, K., "Time–to–space conversion of Tbits/s optical pulses using a self–organized quantum–well material," *Applied Physics Letters* vol. 77, No. 22, Nov. 27, 2000. pp. 3487–2489.

Sun, P.C., Mazurenko, Y.T., Chang W.S.C., Yu, P.K.L., Fainman, Y., "All–optical parallel–to–serial conversion by holographic spatial–to–temporal frequency encoding," *Optical Letters.* Vol. 20, No. 16, Aug. 15, 1995. pp. 1728–1730.

(List continued on next page.)

*Primary Examiner*—John D. Lee
*Assistant Examiner*—Scott Knauss
(74) *Attorney, Agent, or Firm*—Fitch, Even, Tabin & Flannery

(57) ABSTRACT

A small size, low power consumption optical signal processing apparatus is implemented. An optical packet is split into two portions, one of which is used for an optical pulse generator to generate a single optical pulse or an optical pulse train with a period k times the bit period of the optical packet. The single pulse or the optical pulse train is used for an all-optical serial-to-parallel converter utilizing a surface-normal optical switch to convert a second portion of the optical packet into k parallel optical signals, which are then converted into k parallel electrical signals by a photo detector array. The k parallel electrical signals are supplied to an Si-based electronic circuit that implements high-speed optical signal processing. By utilizing the electronic circuit as a memory circuit or label recognition circuit, a buffer processing, address extraction and the like can be implemented.

35 Claims, 20 Drawing Sheets

OTHER PUBLICATIONS

Tan, R. K., Verber, C. M., SpringThorpe, A.J., "Self–Timed Integrated–Optical Serial–to–Parallel Converter for 100 Gbit/s Time Demultiplexing," *IEEE Photonics Technology Letters*. Vol. 6, No. 10, Oct. 1994: pp. 1228–1231.

Wang, S., Ingram, M. "Performance Analysis of an Optical Serial–to–Parallel Converter with Erbium–Doped Fiber Amplifier," *Journal of Lightwave Technology*. Vol. 14, No. 12. Dec. 1996. pp. 2736–2747.

* cited by examiner

OPTICAL SIGNAL PROCESSING METHOD AND OPTICAL SIGNAL PROCESSING APPARATUS

This application is based on Japanese Patent Application Nos. 2000-125516 filed Apr. 26, 2000 and 2000-262115 filed Aug. 31, 2000 in Japan, the contents of which are incorporated here into by reference.

BACKGROUND OF THE INVENTION

1. Field of the Invention

The present invention relates to an optical signal processing method and apparatus that inputs an optical pulse train such as optical packets, and carries out serial-to-parallel conversion or generates an optical clock pulse train and so on.

In addition, the present invention relates to a label processing method and apparatus for recognizing address information and the like of high-speed optical packets.

Furthermore, the present invention relates an optical memory method and apparatus that allows a memory composed of an electronic circuit to write freely a high-speed optical packet signal, and to read and output it as an optical packet signal, again.

Moreover, the present invention relates to implementing higher order functions such as a router or optical computer by combining techniques such as serial-to-parallel conversion, optical clock pulse generation, label processing and optical memory.

2. Description of the Related Art

Recently, with the explosive growth of data communications typified by the Internet, the need for enhancing the speed of optical signals has been increasing. In such an environment, a problem arises about processing directly an electrical signal with a rate greater than 10 Gbps by a conventional electronic circuit after converting an optical signal into an electrical signal by a photo detector. For example, such a router in optical packet communications needs a label recognition function in order to decide an output port by decoding the address information contained in the label of the optical packet, and a buffer memory function for delaying packet signals by a desired time period in order to avoid collision between optical packets. In such a case, since the conventional label recognition processing or memory processing function is usually carried out by silicon based LSIs, their speed is limited to less than 1 Gbps.

Thus, it is becoming increasingly difficult for employing conventional silicon-based electronic circuits to implement the label recognition processing or memory processing for the high-speed optical packet signals.

In view of this, such a technique as shown in FIG. 17 has been proposed recently. In FIG. 17, a high-speed optical packet signal is converted into an electrical signal by an O/E (optical-to-electrical) receiver 1 using a photo detector. Then, a clock signal is extracted from the electrical signal by an electrical clock signal generator 2 using InP- or GaAs-based high-speed electronic circuit technology. Using the clock signal, the high-speed electrical signal is converted into a plurality of parallel low-speed electrical signals by an electric serial-to-parallel converter 3, thereby enabling label recognition. On the other hand, as the memory processing, the following scheme is conceived. The electrical signals passing through the parallel conversion are stored into a memory cell array 4 consisting of an SRAM. When reading the electrical signals, the plurality of low-speed output electrical signals read out of the memory cell array 4 are rearranged into a high-speed serial electrical signal by an electrical parallel-to-serial converter 5 using the electronic circuit technology, and the high-speed serial electrical signal is finally converted into an optical packet signal by an E/O (electrical-to-optical) transmitter 6.

The method, however, is considered to have a limit of about 40 Gbps because it entirely depends on electronic circuits 2, 3 and 5 to implement the clock signal generation, serial-to-parallel conversion and parallel-to-serial conversion. Furthermore, to achieve the serial-to-parallel conversion to convert the serial signal to the plurality of low-speed signals by the InP- or GaAs-based high-speed electronic circuit technology, the high-speed electrical signal must be successively halved in frequency (such as 40 GHz→20 GHz→ . . . →several hundred MHz), which requires not a few stages, and hence presents a problem about clock extraction, phase control and the like at each stage. Besides, using the electronic circuits will increase the total power consumption considerably. In addition, since it is necessary for the conventional clock extraction by the electronic circuit to lock the oscillation frequency of the VCO (Voltage-Controlled Oscillator) using the feedback in the PLL (Phase Locked Loop), it is impossible to extract the clock signal instantaneously for the packet signal input in a burst.

Apart from the foregoing systems, several researches are conducted about parallel conversion (also called "time to space conversion") of a high-speed serial optical signal. As a conventional optical serial-to-parallel conversion method, such a scheme is conceived as splitting a high-speed optical signal into a plurality of optical signals, followed by converting the individual optical signals into low-speed optical signals using high-speed all-optical switches. For example, to carry out parallel conversion of a 100 Gbps high-speed optical signal to ten 10 Gbps low-speed optical signals, ten all-optical switches are used.

As other optical serial-to-parallel conversion methods, the following techniques are proposed. A method using a plurality of surface emitting second harmonic generation processes (Shih-Chen Wang et al., J. Lightwave Technol. Vol. 14, No. 12, P. 2736 (1996)); a method using exciton giant non-linear effect (K. Ema et al., Appl. Rhys. Lett. Vol. 59, No. 25, p. 2799 (1991)); and a method using hologram (P. C. Sunetal., Opt. Lett. Vol. 20, No. 16, p. 1728 (1995)).

However, the conventional method using the plurality of all-optical switches for the all-optical serial-to-parallel conversion has a problem of requiring a large scale apparatus, and increasing the power consumption. The conventional method using the surface emitting second harmonic generation has a problem of extremely low efficiency and large loss because of using non-resonant optical nonlinear effect. The conventional method using the exciton giant nonlinear effect has a problem of a need for cooling the nonlinear medium to the liquid helium temperature to achieve large nonlinear effect. Finally, the conventional method using the hologram has a problem of an extremely large loss because of using diffraction effect. Thus, all the conventional methods offer problems of demanding extremely large running costs, and being ineffective and difficult to maintain stable performance for a long time.

SUMMARY OF THE INVENTION

To solve the foregoing problems of the conventional techniques, a first object of the present invention is to implement optical signal processing by various silicon-based electronic circuits with low power consumption and rather simple configuration by allowing the high-speed input optical packet signal to convert itself into low-speed parallel optical signals.

To solve the foregoing problems of the conventional techniques, a second object of the present invention is to implement instantaneous reading of the label information in a high-speed optical packet that is input in a burst mode by generating a single optical pulse from the input optical packet, by converting the label of the optical packet into parallel signals at once using the optical pulse, and by leading the parallel signal to a label recognition circuit used as the silicon-based electronic circuit.

To solve the foregoing problems of the conventional techniques, a third object of the present invention is to implement a high-speed, low power consumption optical memory method and apparatus capable of handling a burst mode signal.

A fourth object of the present invention is to implement higher order functions of a router, optical computer or the like by combining techniques such as serial-to-parallel conversion, optical clock pulse generation, label processing and optical memory.

The optical signal processing method in accordance with the present invention enables a silicon-based electronic circuit, which is highly functional but is rather slow in its operation speed, to carry out the signal processing by allowing an input high-speed optical packet to convert itself into low-speed parallel signals. The foregoing conventional electronic circuit must extract a clock signal, repeatedly divide the optical packet signal (one 10 GHz signal→two 5 GHz signals→four 2.5 GHz signals, etc.), and convert the divided signals to low-speed parallel electrical signals, which requires to divide the frequency of the clock signal and to adjust the timing. In contrast with this, the first method in accordance with the present invention generates a single optical pulse from the initial bit of the optical packet signal, and thereby optically converts the optical packet partly or entirely into parallel optical signals at once with optical state, thereby implementing the high-speed optical signal processing with a very simple configuration.

It is necessary for the first optical signal processing method in accordance with the present invention to generate constantly the single optical pulse from the input optical packet signal at a fixed timing as described above. To achieve this, the present method irradiates the photoconductive switch with the optical packet to supply the charges generated thereby to the capacitor to be stored. Once the capacitor is charged with the charges generated by the initial bit of the optical packet, the potential of the capacitor is kept at a fixed value independently of the manner in which the photoconductive switch is irradiated with the subsequent optical pulses involving various patterns. The potential of the capacitor that is raised abruptly by the initial bit is differentiated by a CR differential circuit to be converted into an electrical output pulse. The electrical pulse drives a semiconductor laser, thereby generating an optical pulse. The method in accordance with the present invention offers the following advantages. First, since the optical pulse is always generated from the initial bit of an incoming optical packet, the time period from the arrival of the optical packet to the generation of the single optical pulse is fixed. In addition, it can generate the single pulse instantaneously even for an optical packet arriving in a burst mode, which is difficult for the conventional electronic circuit. Furthermore, it can operate independently of the polarized state of incoming optical packets, and place always the polarized state of the output optical pulses in a fixed state (the characteristic is indispensable for the all-optical serial-to-parallel converter that will be described later). Moreover, once the capacitor is charged to its full by the initial bit, its dependency on the intensity is lost. Accordingly, the intensity of the optical output pulses is fixed constant in spite of the fluctuations in the intensity of the input optical packets. In addition, to extract a 40 GHz clock signal, for example, although the conventional method must use the electronic circuit with the corresponding speed, the method in accordance with the present invention can utilize an electronic circuit with a bandwidth of about a few gigahertz, because it employs the Gain-switch method of the semiconductor laser, which generates optical pulses with a width less than 20 ps from electrical pulses with a width of a few hundred picoseconds.

As for the method of parallelly converting the optical packet in part or in its entirety at once (the details of which will be described later), it is implemented by irradiating one point on a surface-normal optical switch with the single optical pulse generated by the foregoing method and k parallel optical packet signals with their phases being shifted bit by bit in order of precedence, thereby increasing the transmittance or reflectance at that point. According to the present method, since no external power supply is needed, and the surface-normal optical switch operates at its one point, the method can achieve its function with very low light intensity, making it possible to configure a low power consumption all-optical serial-to-parallel converter. In addition, a bunch of optical fibers disposed at each input port enables the surface-normal optical switch to operate at its multiple points, which can markedly increase the number of the parallel conversion by the same all-optical serial-to-parallel converter. Furthermore, although the conventional method using the electronic circuit requires a plurality of parallel converters to process a plurality of optical packets, the present method can carry out the parallel conversion of a plurality of optical packets independently and simultaneously using a single apparatus.

The partial or entire bits of the high-speed optical packet thus undergoing the simultaneous parallel conversion are converted to low-speed parallel electrical signals by a low-speed optical-to-electrical converter to be processed by a silicon-based electronic circuit. In this case, various types of silicon-based electronic circuits are applicable, and their different functions will change the functions of the high-speed optical signal processing apparatus in its entirety. For example, in the field of optical data communications, an optical label processing apparatus for high-speed optical packets can be configured by carrying out the parallel conversion of the label sections of IP optical packets by the foregoing method, and by utilizing a label recognition circuit for decoding the label information as the electronic circuit. Furthermore, as for 32-bit or 64-bit optical data, an optical data D/A (digital-to-analog) converter with a speed much higher than conventional converters can be implemented by carrying out simultaneous parallel conversion of all the bits of the optical data, and by employing an LSI with a function of D/A conversion as the electronic circuit.

The second optical signal processing method in accordance with the present invention carries out its processing as follows. It converts the single optical pulse into an optical pulse train with a loop optical waveguides. Then, using the foregoing all-optical serial-to-parallel converter, it iteratively carries out simultaneous parallel conversion of the optical packet on a k-bit by k-bit basis, thereby converting the entire optical packet into k low-speed optical signal streams. Subsequently, the k low-speed optical signal streams are converted into the same number of electrical signal streams by a low-speed optical-to-electrical converter, to be processed by a silicon-based electronic circuit. The present method is effective to process a long optical packet in its entirety. For example, using a silicon-based electronic memory as the electronic circuit makes it possible to write freely a ultra high-speed optical packet signal into the electronic memory. Furthermore, the k parallel electrical signals read out of the electrical memory are reconstructed into a high-speed optical packet signal again by an electric-parallel to optical-serial converter (the details of which will be described later) to be output.

As described above, the methods in accordance with the present invention can materialize a low power consumption, simple, small size, high-speed optical signal processing apparatus. In addition, it can handle a burst mode signal, and process the high-speed optical packets in part or in its entirety with no holds barred. The present invention can implement the following functions by using the label recognition circuit or electronic memory as the electronic circuit. First, it can implement a high-speed optical label recognition function (a function of reading address information of an optical packet, and deciding an output port), which will be indispensable as a function of a ultra high-speed router in the future. Second, it can implement a high-speed optical buffer memory function (a function of temporarily saving an optical packet to avoid collision between optical packets at an output port).

Moreover, since the present invention can implement high-order functions of such as a high-performance router or optical computer by combining the foregoing techniques such as the serial-to-parallel conversion, optical clock pulse generation, label processing and optical memory in accordance with the present invention, it is expected to greatly serve in the technical fields associated with the optical information processing.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The configurations and operations of optical switches according to the embodiments of the present invention will be described below with reference to the drawings.

Figure 1A:
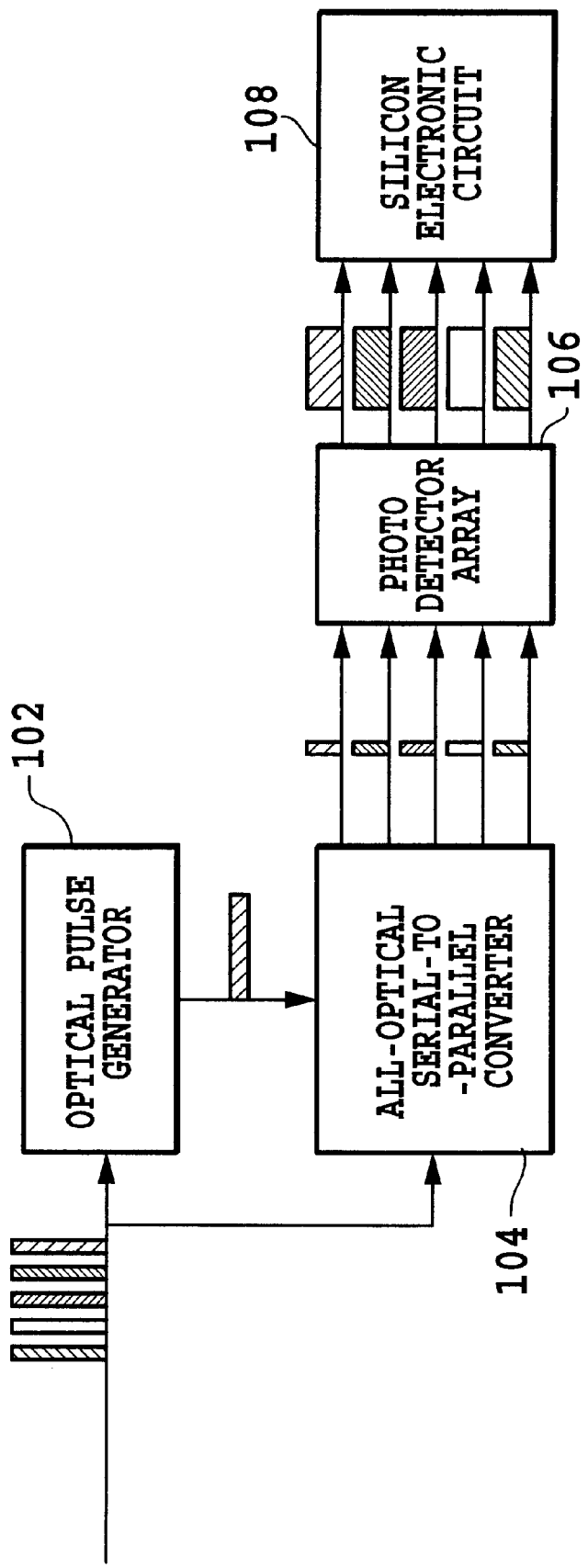
FIGS. 1A and 1B are block diagrams each showing a configuration of an optical signal processing apparatus in accordance with the present invention.
Figure 1B:
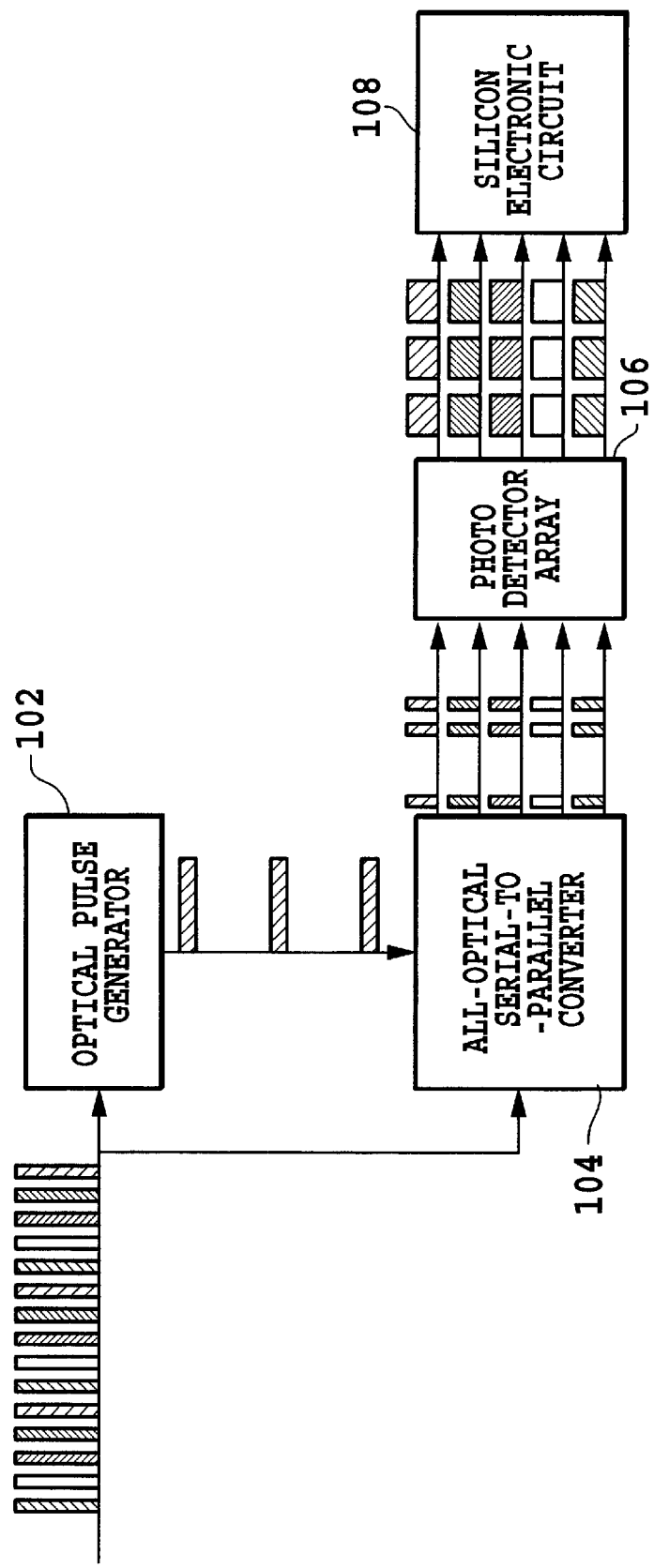

As described before, it is becoming increasingly difficult for the conventional silicon-based electronic circuits to handle high-speed electrical signals converted from high-speed optical signals with the appearance of the high-speed optical signals. FIGS. 1A and 1B are block diagrams each showing a configuration of an optical signal processing apparatus in accordance with the present invention. Each of them splits the high-speed optical packet signal into two portions, one of which is led to an optical pulse generator 102 for generating an optical pulse or pulses, and the other of which is supplied to an all-optical serial-to-parallel converter 104 for spatially converting the supplied optical packet signal into parallel signals. Subsequently, the optical signals consisting of narrow pulses are converted into low-speed electrical signals using a low-speed photo detector array 106 as an optical-to-electrical converter, followed by processing by an electronic circuit 108 composed of a silicon LSI. Thus, they can perform processing of the high-speed optical packet signal (at a rate of the operation speed of the electronic circuit×the parallel number).

The optical processing apparatus as shown in FIG. 1A is effective when the number of the bits of each optical packet is small (<100) because it causes the optical pulse generator 102 to generate one optical pulse every time each optical packet arrives, and carries out the parallel conversion of all the bits of the optical packet at once. For example, in the optical data communication typified by the Internet, although the bit length of the optical packet itself is long, the label (or header) of the packet including address information or the like is about a few tens of bits. Accordingly, the simultaneous parallel conversion of the label, followed by the processing by a label recognition circuit in the silicon LSI 108 (header processing circuit 34 in FIG. 11, which will be described later) can implement the address extraction of a ultra high-speed optical packet.

In addition, signal processing of 32-bit or 64-bit high-speed optical data which is required by an optical computer or the like can be performed by a high-speed digital-to-analog converter configured by utilizing a D/A (digital-to-analog) converter as the electronic circuit 108. Besides, juxtaposing the two optical signal processing apparatuses as shown in FIG. 1A and supplying the parallel signals to a single logic operation circuit (not shown) makes it possible to configure a ultra high-speed logic operation circuit for the two high-speed optical data.

On the other hand, it is difficult for the scheme as shown in FIG. 1A to process a long optical packet in its entirety, because of the difficulty of configuring the all-optical serial-to-parallel converter 104 with a great parallel number. In such a case, the system as shown in FIG. 1B is effective which causes the optical pulse generator 102 to generate a low repetition optical pulse train (with a period of k times the bit interval of an input optical packet) so that the all-optical serial-to-parallel converter 104 carries out the parallel conversion of the optical packet signal by every k bit interval successively, followed by the conversion to the low-speed electrical signals by the low-speed photo detector array 106, and by the processing by the electronic circuit 108. For example, it is applicable to storing the entire high-speed optical packet signal into a silicon-based electronic memory (such as an array of silicon random access memories 400 of FIG. 12 which will be described later).

The detail will now be described of the optical pulse generator 102 and the all-optical serial-to-parallel converter 104 constituting them, and of a high-speed optical label processing circuit as an embodiment of FIG. 1A, and an optical memory as an embodiment of FIG. 1B. As for the optical memory, it is necessary to regenerate the original optical packet from the parallel electrical signals when reading the optical packet, the operation of which will also be described later.

[All-optical Serial-to-parallel Converter]

Figure 2:
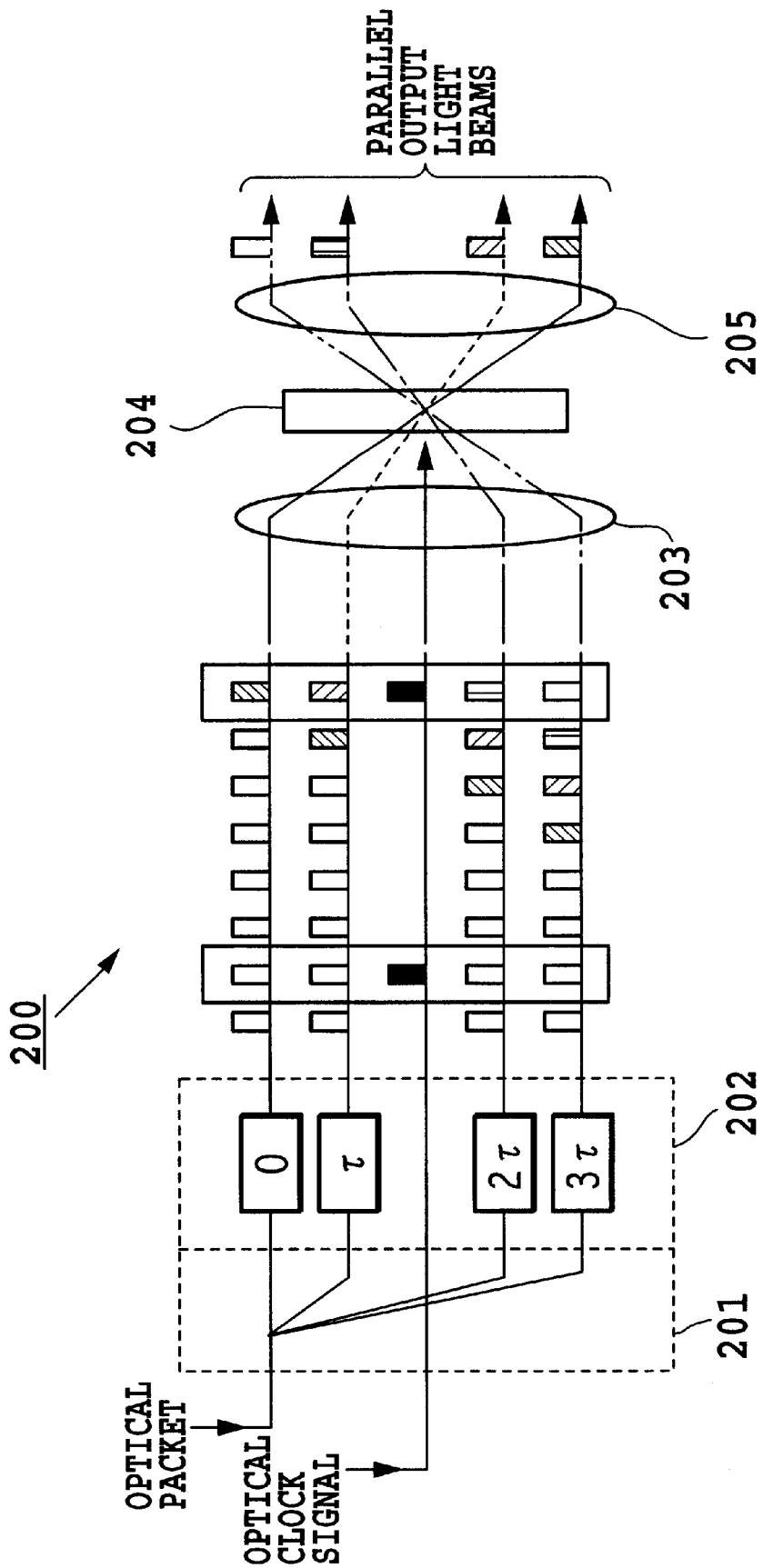
FIG. 2 is a diagram illustrating an embodiment in accordance with the present invention for carrying out serial-to-parallel conversion of an optical signal stream.

FIG. 2 is a diagram showing a configuration of an all-optical serial-to-parallel converter 200 of an embodiment in accordance with the present invention. In FIG. 2, the reference numeral 201 designates an optical splitter for splitting a serial optical input signal into k optical signals; 202 designates an optical delay unit for providing the split parallel optical signals with delays successively increasing by one bit; 203 designates a focusing lens, 204 designates a surface-normal optical transmission switch (all-optical switch), and 205 designates a focusing lens.

The input optical packet is split into k signals by the optical splitter 201, and each of them is delayed in increments of one bit to the adjacent signal individually. In this case, considering a particular timing of the k parallel optical signals, the k consecutive bits of the input optical packet takes place at that timing which are comprised each one bit of the k parallel optical signals. Although the k parallel optical signals are represented in a plane in FIG. 2, there is no problem if they are arranged two dimensionally in the direction normal to the sheet of FIG. 2. Taking an example in which they are arranged in a 5×5 matrix normal to the sheet, only the central one. of them is an optical control pulse, and the 24 remainders around it are the parallel optical signals split by the optical splitter 201. The 24 parallel optical signals and the one optical control pulse are focused onto a point on the surface-normal optical switch 204 through the focusing lens 203.

The surface-normal optical switch 204 can be either a saturable absorption type or an etalon type. When irradiated with an optical control pulse, the former increases its transmittance because of a reduction in the absorption coefficient of its active layer, and the latter varies its transmittance because of the change in the refractive index of its active layer. In either case, the transmittance of the surface-normal optical switch 204 is very small when the optical control pulse (optical clock) is in the "0" state, thereby blocking the parallel optical signals. In contrast, when the optical control pulse is "1", the transmittance increases, thereby passing the parallel optical signals.

Since the spatially arranged 24 parallel optical signals are delayed in increments of one bit for the successive ports, the 24 consecutive bit data of the incoming optical signal arrive simultaneously at the optical switch 204 in parallel at the timing when the optical control pulse arrives. Accordingly, in response to an increase in the transmittance of the optical switch 204 by the optical control pulse, the 24-bit data of all the ports pass through the optical switch 204 simultaneously, and are developed onto the lens 205 ahead in parallel spatially. Thus, the information carried by the high-speed optical signal (optical packet) undergo the parallel conversion to the low-speed 24 parallel optical signals in synchronism with the optical control pulse. Here, the period of the optical control pulse train is 24 times the bit period of the incoming optical packet.

Figure 3:
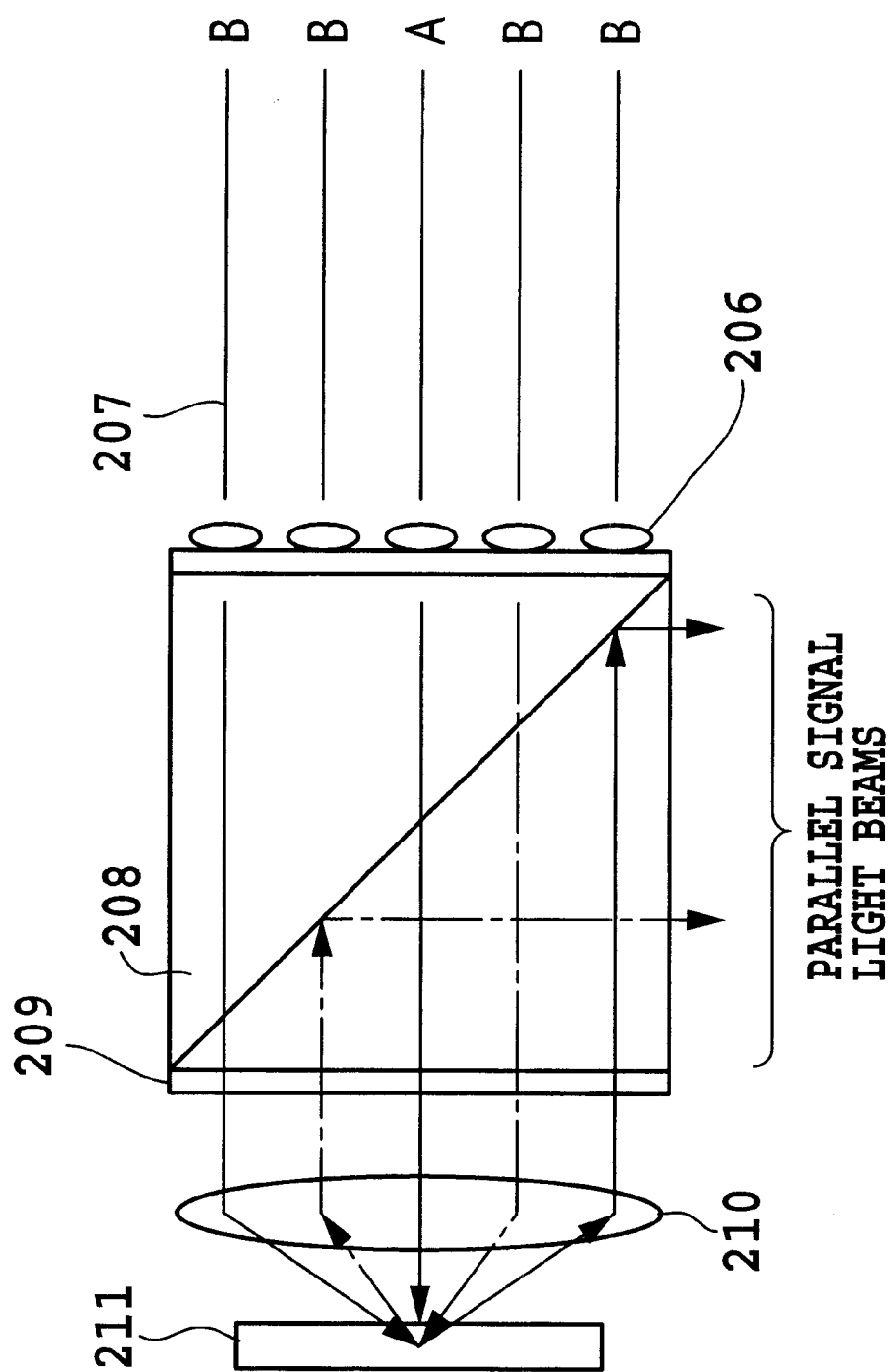
FIG. 3 is a diagram illustrating an embodiment in accordance with the present invention for carrying out serial-to-parallel conversion of an optical signal stream.

FIG. 3 is a diagram showing an embodiment of the all-optical serial-to-parallel converter utilizing a surface-normal optical reflection switch 211 as the surface-normal optical switch. A 100% mirror evaporated onto an unilateral surface (left-hand side of FIG. 3) of the surface-normal optical switch 204 in FIG. 2 makes it the reflection type, which makes it possible to increase the absorption coefficient of the active layer or the variation in the refractive index, thereby implementing a surface-normal optical reflection switch 211 with a large extinction ratio. Here, one control beam A and a plurality of signal beams B are launched into a micro-lens array 206 via multiple optical fibers 207 connected to the individual micro-lenses. The reference numeral 208 designates a polarizing beam splitter (PBS), to the plane of incidence of which the micro-lens array 206 are attached; and 209 designates a quarter-wave plate disposed on the surface of the PBS 208 at the side of a focusing lens 210.

By setting the control beam A and signal beams B at linearly polarized light passing through the PBS 208, the signal beams B, which reflect off the surface-normal optical reflection switch 211, and travel back and forth through the quarter-wave plate 209, become linearly polarized light rotated by 90 degrees. Thus, the signal beams B are reflected by the PBS 208, and output as parallel optical pulses.

The method, however, has a problem in that part of the signal beams that are not absorbed by the surface-normal optical reflection switch 211 even-when the control beam A is "0", are likely to be reflected off the surface-normal optical reflection switch 211 and output therefrom. Accordingly, to increase the ON/OFF ratio of the signal beams B (the ratio of the intensities between the output signal beams when the control beam is "1" and "0"), it is necessary to increase the variation in the absorption coefficient of the surface-normal optical reflection switch 211, which requires to increase the intensity of the control beam A. To increase the ON/OFF ratio of the signal beams B without much increasing the control beam A, the output of the signal beams B must be suppressed as much as possible when the control beam A is "0".

Figure 4:
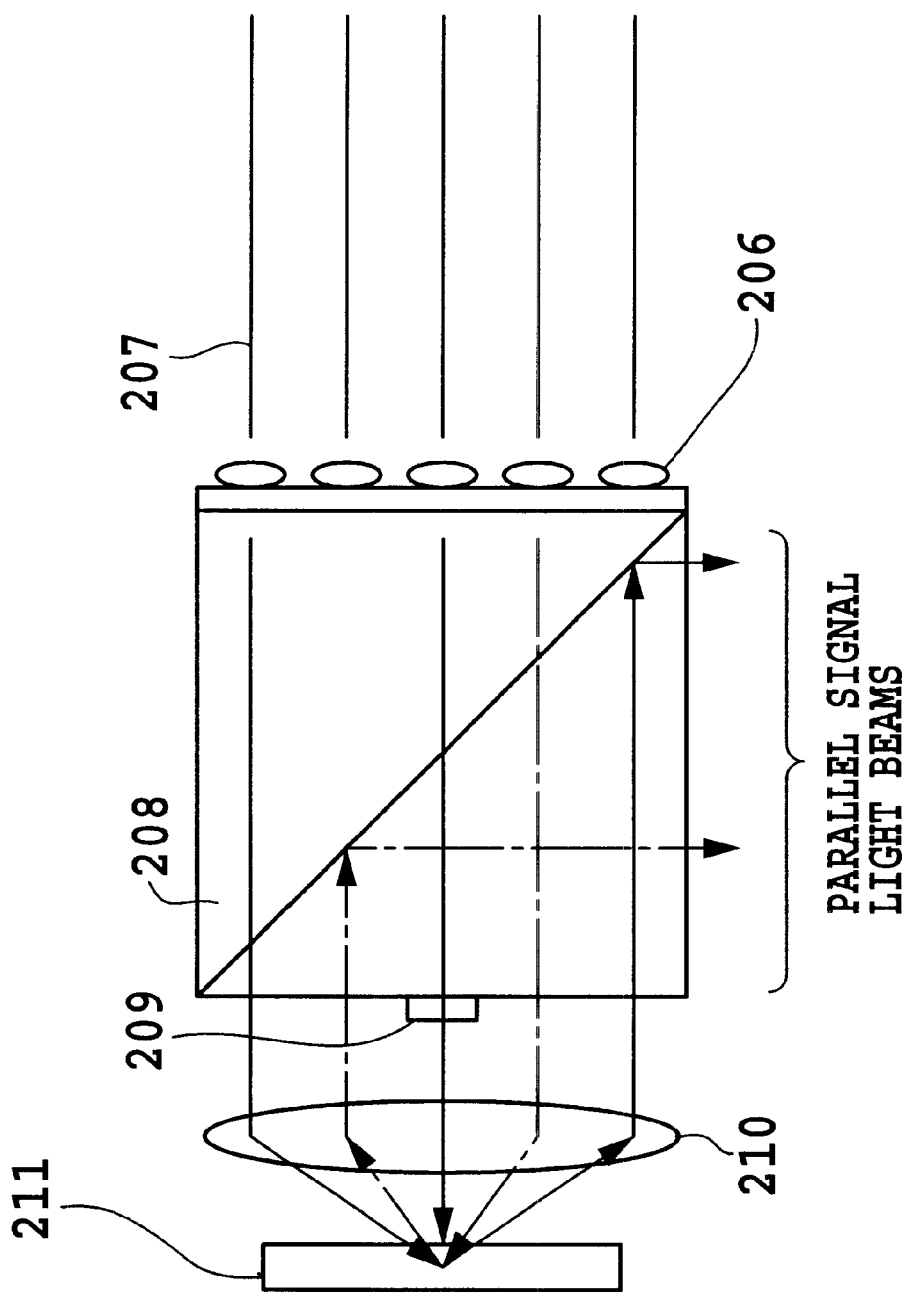
FIG. 4 is a diagram illustrating an embodiment in accordance with the present invention for carrying out serial-to-parallel conversion of an optical signal stream.

Thus, as shown in FIG. 4, the parallel optical signals and the control beam obtained by splitting the optical signal are set at linearly polarized light passing through the PBS 208. In addition, the size and position of the quarter-wave plate 209 are set such that only the central control beam passes through the quarter-wave plate 209. Accordingly, only the control beam is transformed to circularly polarized light through the quarter-wave plate 209, leaving the remaining parallel optical signals in the linearly polarized state and focused on one point on the surface-normal optical reflection switch 211 through the lens 210. Its operation principle will now be described taking an example of a saturable absorption type surface-normal optical switch.

As for electrons and holes, there are two states of up-spin and down-spin for one energy state in degeneracy. Considering the exciton transition of the electron-heavy hole, when the circularly polarized control beam is incident on a point on the multiple quantum well layer (MQW layer) of the optical reflection switch 211, one of the spins is excited, whereas when the linearly polarized parallel optical signals are incident thereon, both spins are excited. As a result, when the circularly polarized control beam of "1" excites only one of the spins, only the parallel optical signals in the polarized state that has interaction with the spin perceive the variations in the absorption and refractive index. In other words, irradiation with the linearly polarized parallel optical signals causes only the circularly polarized components with the same polarized state as the control beam to undergo modulation by the control beam, so that the parallel optical signals reflected off the surface-normal optical reflection switch 211 become elliptically polarized light, and are reflected off the PBS 208. On the other hand, when the control beam is "0", since the parallel optical signals cannot change their polarized state, they are not reflected off the PBS 208, returning to their own port, and hence the output light beams become approximately "0".

The switching speed of the surface-normal optical reflection switch 211 according to the method is determined by the shorter one of the spin relaxation time and the carrier life time. As for a multiple quantum well layer grown at 500 degrees Celsius that is commonly used as an active layer, the carrier life time is an order of nanoseconds, which means that the switching speed can be improved up to the spin relaxation time of a few tens of picoseconds. On the other hand, using a quantum well layer that is grown at a low temperature of about 200 degrees Celsius, and added with a dopant of a p-type element or Be by an amount of at least $10^{37}$ cm$^{-3}$ with the carrier life time of less than 10 ps, makes it possible to fabricate a higher-speed surface-normal optical switch.

The foregoing method, however; limits the polarized state of the parallel optical signals to the linearly polarized state. Considering applications to actual optical communications, the optical signals of a given polarized state must be handled. In view of this, in FIG. 5, reflection-type surface-normal optical reflection switches 211 and 211A, quarter-wave plates 209 and 209A, and lenses 210 and 210A are disposed on consecutive two sides of the PBS 208, respectively, so that using the circularly polarized control beam makes the parallel optical signals polarization independent.

Figure 5:
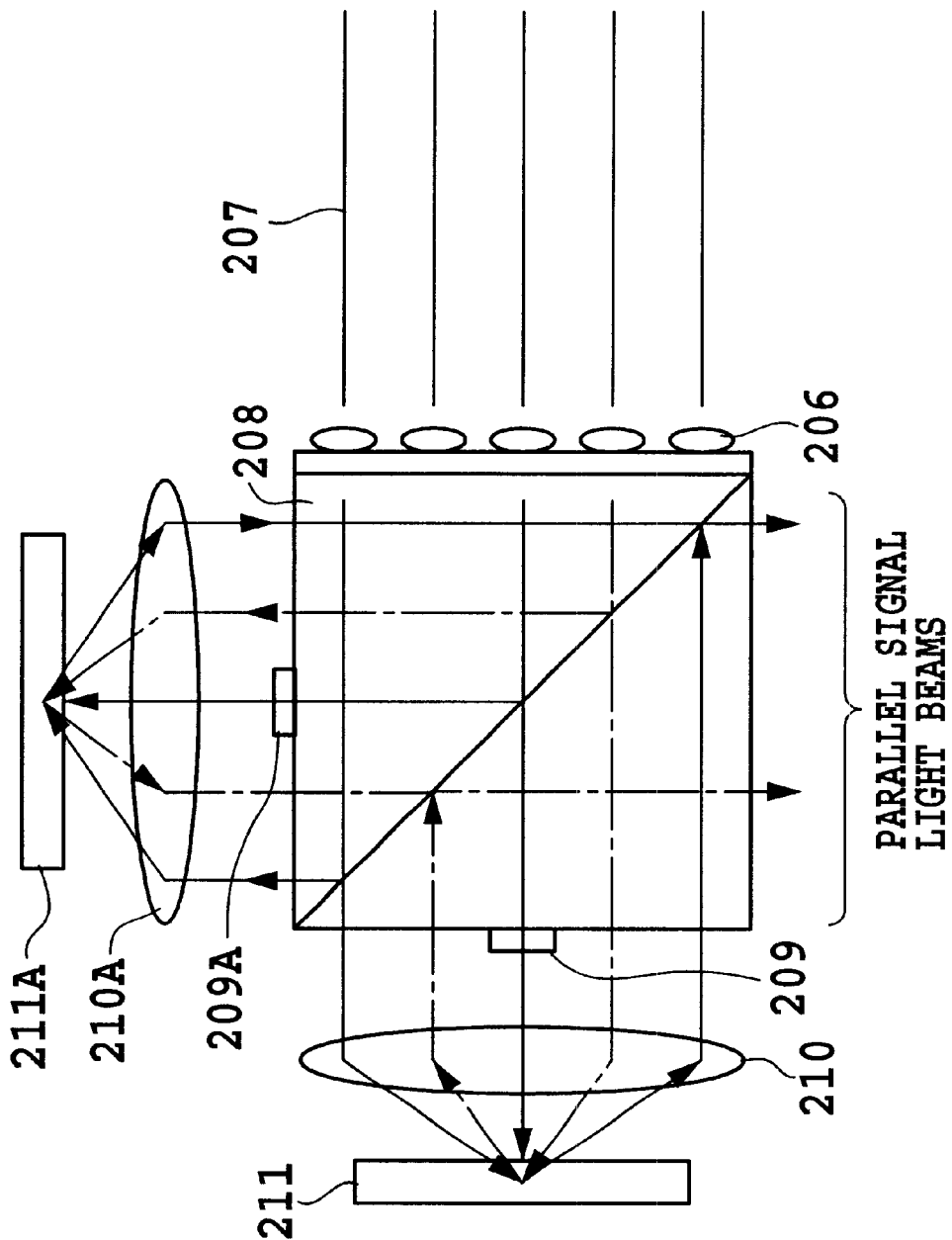
FIG. 5 is a diagram illustrating an embodiment in accordance with the present invention for carrying out serial-to-parallel conversion of an optical signal stream.

In FIG. 5, the central circularly polarized control beam is split into two linearly polarized orthogonal light beams with the same intensity by the PBS 208. They pass through the quarter-wave plates 209 and 209A to become circularly polarized light again, irradiate the surface-normal optical reflection switches 211 and 211A, and cause the parallel optical signals to be reflected. In this case, since the surface-normal optical reflection switches 211 and 211A are irradiated with the-control beams of the identical intensity, their reflectances are equal.

Thus, the incident parallel optical signals with given polarization are split by the PBS 208 in response to their polarized states, and reflected by the surface-normal optical reflection switches 211 and 211A. The intensities of the parallel optical signals reflected off the two surface-normal optical reflection switches 211 and 211A are always equal independently of the polarized state of the two optical signals, and they are combined by the PBS 208 again to be output. Thus, it can implement the polarization independence of the optical signals.

To increase the number of parallel conversion in the method as shown in FIGS. 2–5, the number of the microlens array 206 has to be increased. Accompanying this, since the ratio of the diameter of the beams to that of the focusing lens 210 becomes smaller, the size of the spot focused by the focusing lens 210 grow larger, so that it can become necessary to increase the power of the optical control pulse to obtain the same power density. In addition, since all the optical signals concentrate on the same spot, nonlinear effect such as saturable absorption effect can take place even with only the optical signals, and this can reduce the effect of the radiation of the control signal, or increase the thermal effect caused by light absorption.

Figure 6A:
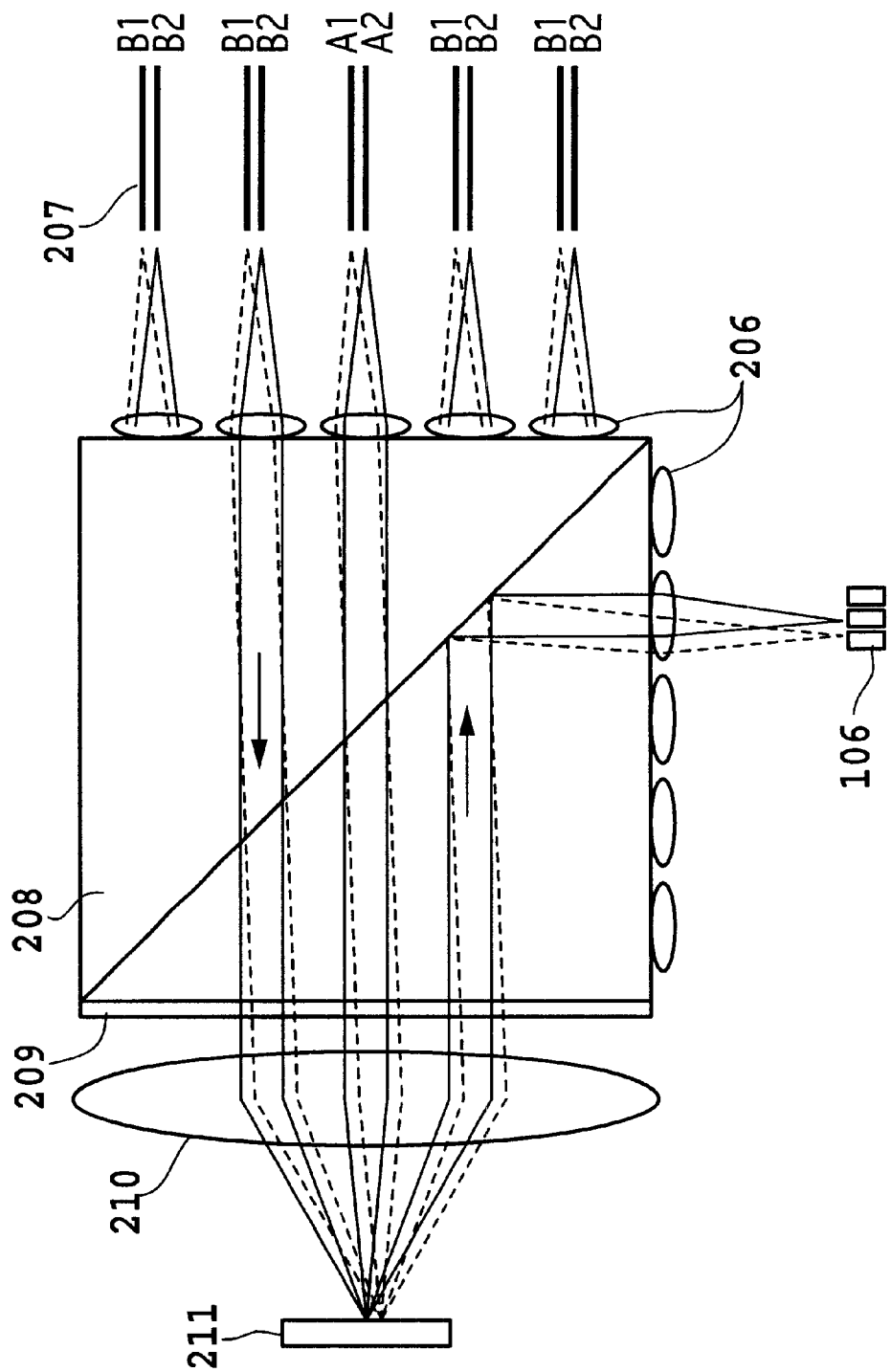
FIGS. 6A to 6C are diagrams illustrating an embodiment in accordance with the present invention for carrying out serial-to-parallel conversion of an optical signal stream.
Figure 6B:
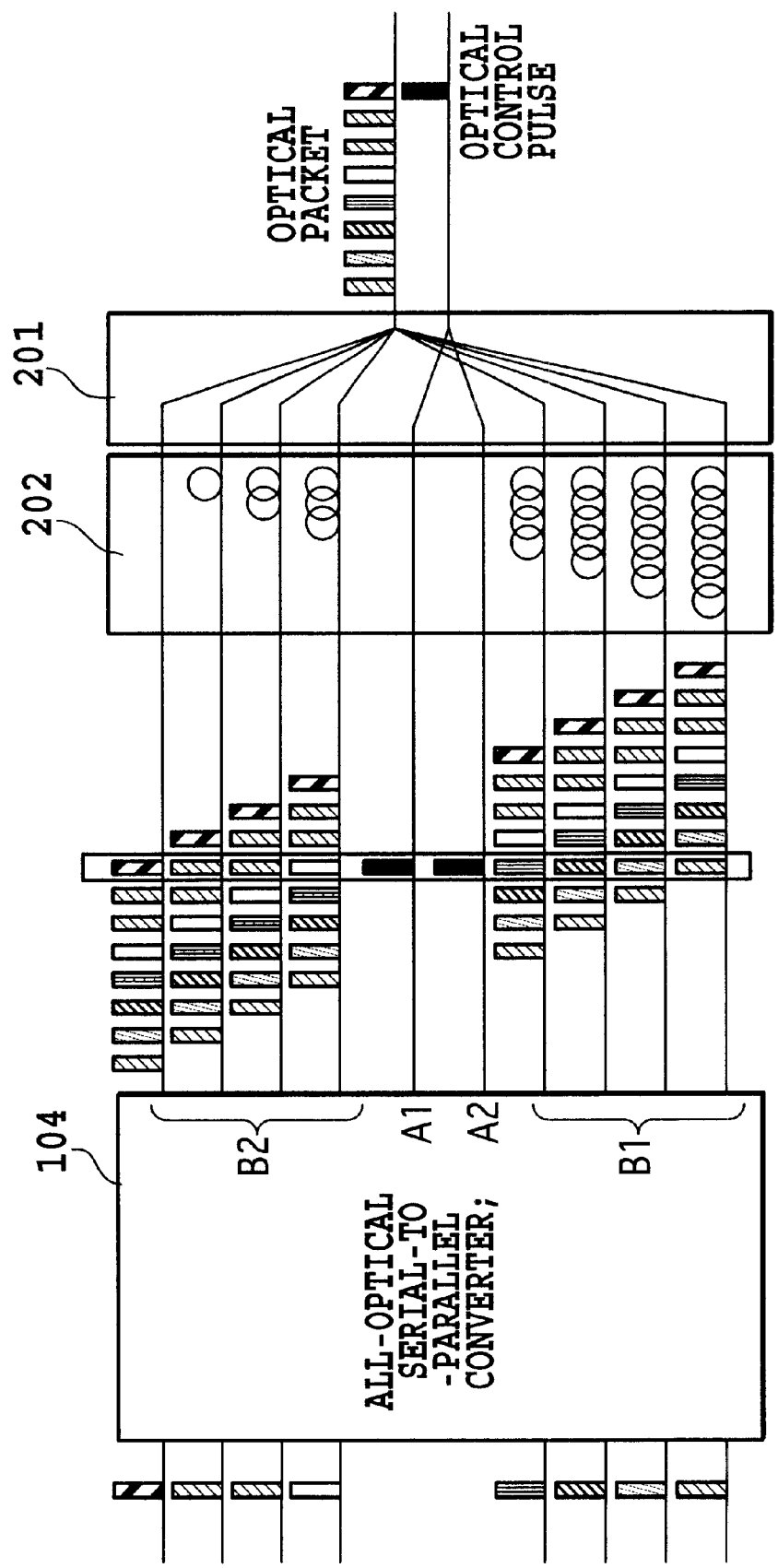

In view of this, a method is conceived that launches L beams into each lens of the micro-lens array 206 from each sheaves of L optical fibers as the optical signals as shown in FIG. 6A. Assume that L=2, and that optical fibers A1 and A2 are placed close together to the input port of the optical control pulse. The optical control pulses output from the optical fibers travel with a little angle difference, and are focused onto the two different points on the surface-normal optical reflection switch 211 through the focusing lens 210. As for each of the ports for inputting the optical packet signals, two optical fibers B1 and B2 are disposed close together to the port so that the optical packet signals input through the optical fibers B1 and B2 are focused on the same spots as those of A1 and A2. As shown in FIG. 6B, the split optical packet signals are delayed in increments of one bit, and the surface-normal optical reflection switch 211 is irradiated with the two halved optical control pulses that arrive at the same time as the entire bits arrive. The beams reflected off the different two points on the surface-normal optical reflection switch 211 travel with the different angles, to be focused onto two different points through the micro-lens array 206 disposed on the output side. The photo detector array 106 is disposed such that its detectors can independently receive the optical pulses passing through the parallel conversion. According to the present method, the number of the parallel conversion can be increased by a factor of L without increasing the scale of the micro-lens array.

Figure 6C:
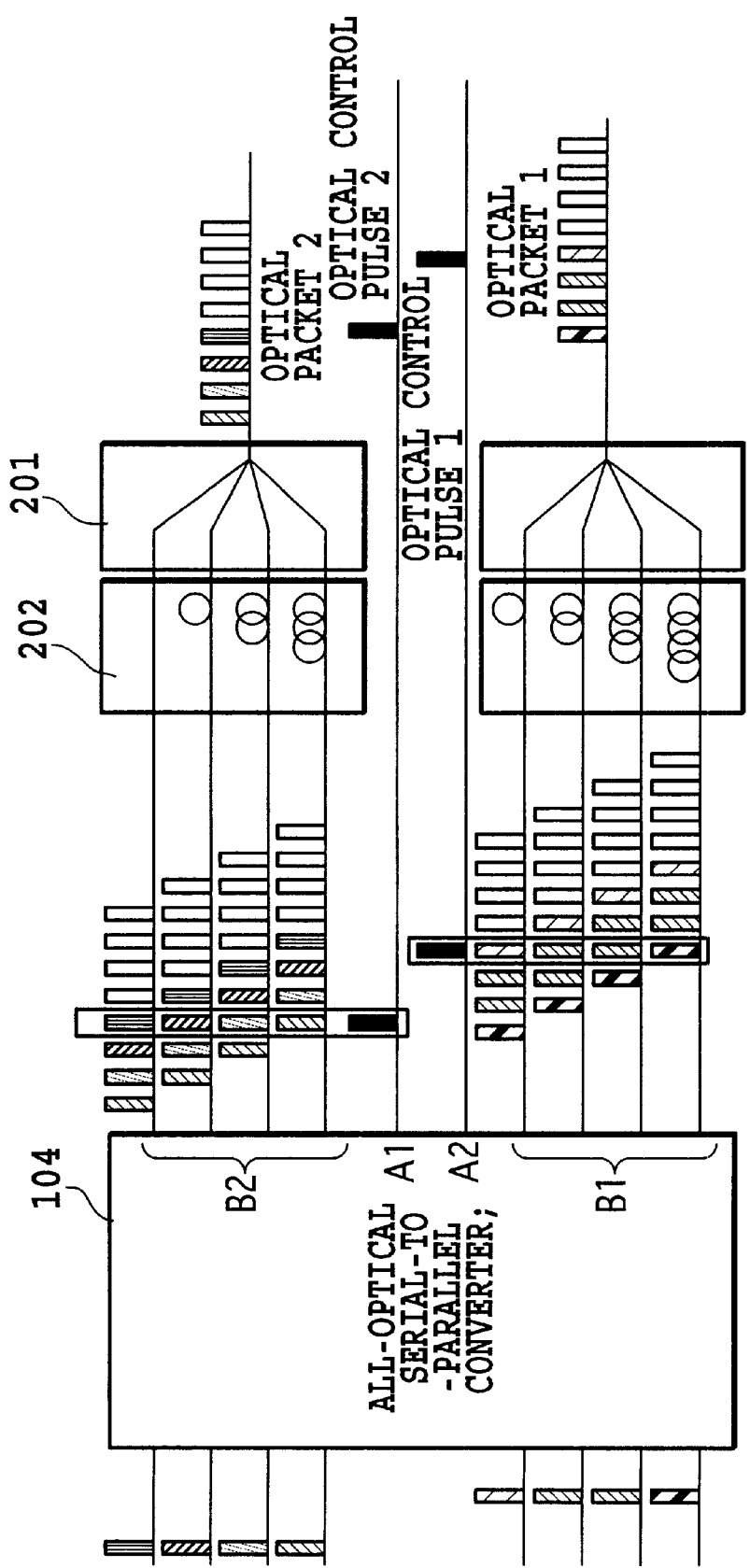

Although the conventional electrical technique requires, when processing a plurality of optical packets, the same number of electrical serial-to-parallel converters, the present method can carry out the parallel conversion of the plurality of optical packet signals independently and simultaneously using a single all-optical serial-to-parallel converter by launching the different optical packet signals into the ports B1 and B2 as illustrated in FIG. 6C.

Figure 7:
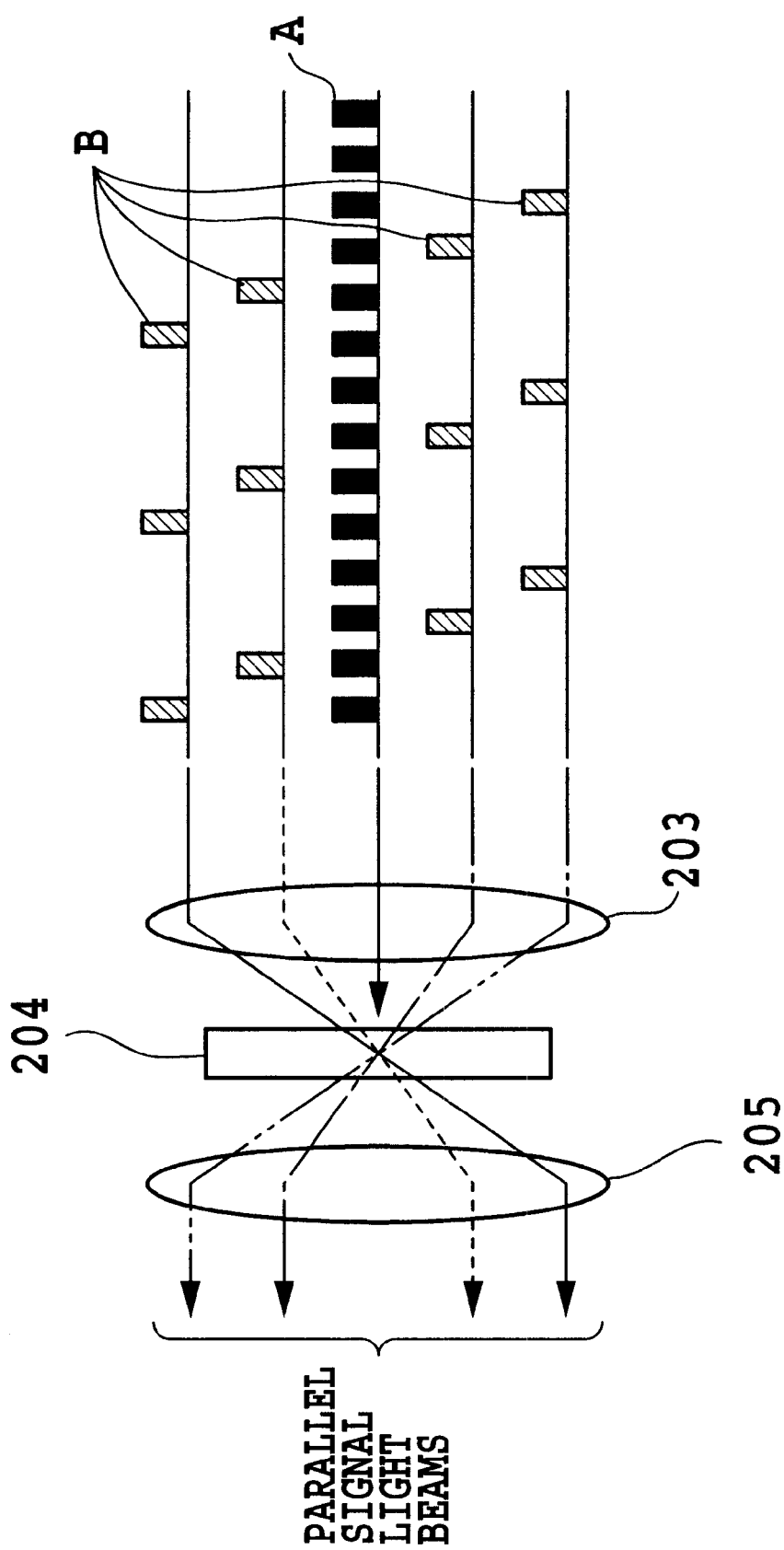
FIG. 7 is a diagram illustrating an embodiment in accordance with the present invention for carrying out serial-to-parallel conversion of an optical signal stream.

Interchanging the input ports of the optical signals and the control signal of FIGS. 2–6, an optical signal processing apparatus can be provided that carries out all optical serial-to-parallel conversion as shown in FIG. 7 (corresponding to FIG. 2). Specifically, there are two types of optical signals in FIG. 7; a high-speed optical signal A and a low-speed cyclic probe light B. The serial optical signal A is input to the port to which the control signal is input in FIG. 2, and the parallel probe light beams B are input to the ports to which the optical signal are input in FIG. 2 (because of the difference in operation, the signals corresponding to the control signal is called probe light beams here). The single serial optical signal A is subjected to the serial-to-parallel conversion using the plurality of probe light beams B. In this case, the optical pulse train of the optical signal A and the probe light beams B are focused on a point on the surface-normal optical transmission switch 204 with a semiconductor multiple quantum well layer through the focusing lens 203.

The plurality of spatially arranged probe light beams B are delayed in increments of one bit of the optical signal A for respective ports, to be provided with different phases from each other. When the number of the probe light beams B is k, the period of the light beams B is k times the bit interval of the optical signal A. Accordingly, a first bit of the optical signal A is synchronized with a first probe light beam, a second with a second probe light beam, a third bit with a third probe light beam, . . . , and a kth bit with a kth probe light beam. Therefore, when a bit of the optical signal A synchronized with one of the probe light beams B is "1", the optical signal increases the transmittance of the surface-normal optical switch 204, thereby bringing the probe light beam to "1". In contrast, when the bit of the optical signal A synchronizing with one of the probe light beams B, the probe light beam becomes "0", and appears on the lens 205 side.

In this way, the probe light beams B of the individual ports successively undergo modulation of the transmittance by the optical signal A through the multiple quantum well layer of the surface-normal optical switch 204, and are developed onto the focusing lens 205 ahead in parallel spatially. Thus, the information carried by the high-speed optical signal A undergoes the parallel conversion to the plurality of low-speed optical signals.

The configuration as shown in FIGS. 3–6 can also carry out the all-optical serial-to-parallel conversion such as above manner. In addition, integrating the optical splitter 201, optical delay unit 202 and optical fiber array 207 using a glass waveguide such as PLC, the entire size can be further reduced.

Since the foregoing embodiments operate at the one point on the surface-normal optical switch 204 or 211, the surface-normal optical switch 204 or 211 requires only one or two switches, which makes it possible to fabricate a minute, low power consumption device.

[Optical Pulse Generator]

Figure 8:
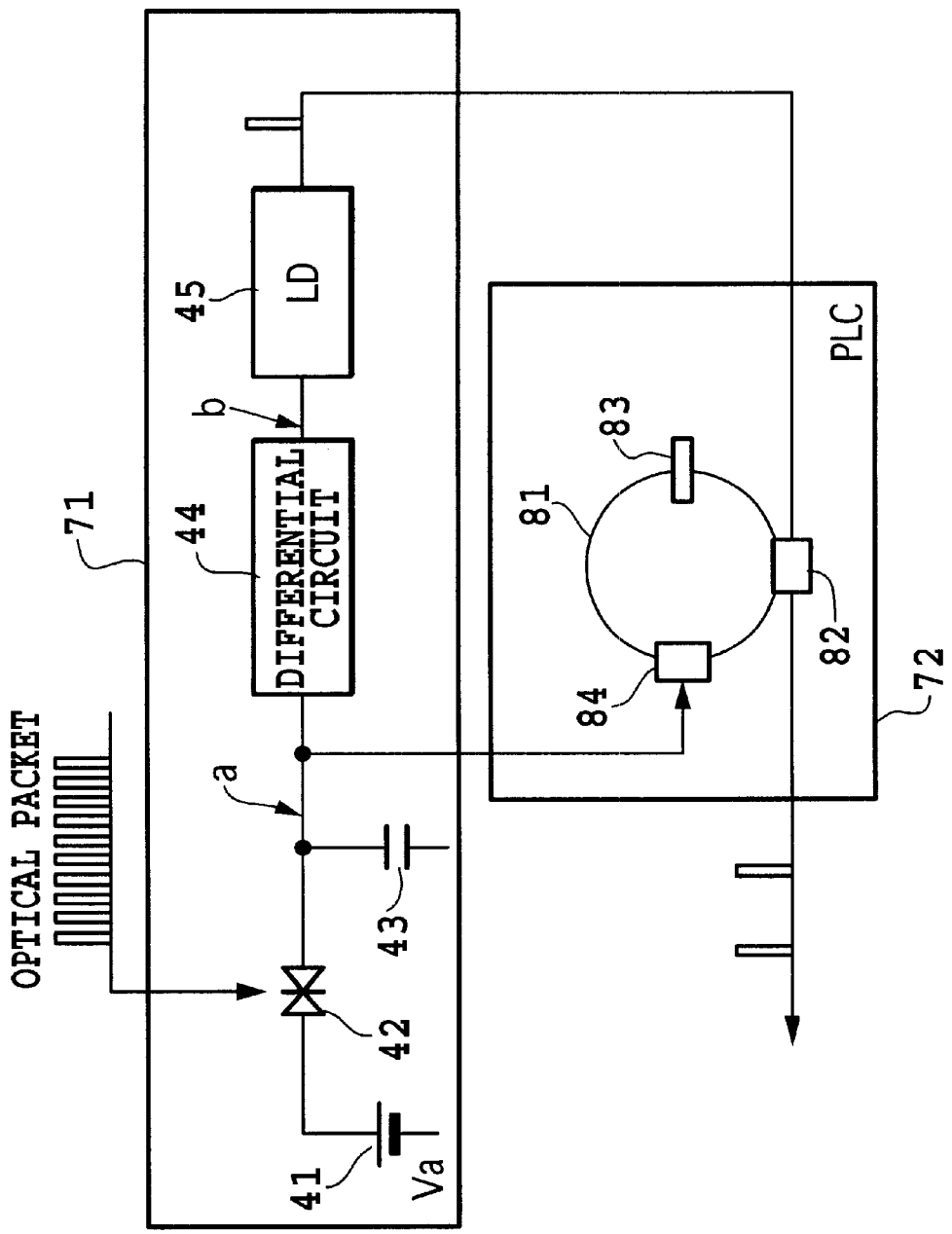
FIG. 8 is a circuit diagram of an optical pulse generator of an embodiment in accordance with the present invention.

FIG. 8 is a circuit diagram showing a configuration of an embodiment of an optical pulse generator for generating the optical control pulse (or probe pulses) required for the foregoing all-optical serial-to-parallel conversion.

In FIG. 8, the reference numeral 71 designates a single-optical-pulse generator for generating a single optical pulse from an optical packet. It includes a power supply 41, a photoconductive switch 42, a capacitor 43, a differential circuit 44, and a semiconductor laser (LD) 45. The reference numeral 72 designates an optical pulse train generator for converting the single optical pulse to an optical pulse train. It comprises a loop waveguide 81, an optical coupler 82, a saturable absorber 83, and an optical amplifier 84, which are formed on a planar lightwave circuit (PLC).

The single-optical-pulse generator 71 comprises the photoconductive switch 42 as a photo detector supplied with a voltage Va from the direct current supply 41, the capacitor 43 to be charged with the optical current output from the photoconductive switch 42, the differential circuit 44 for differentiating the voltage of the capacitor 43, and the semiconductor laser 45 that is driven by the output pulse of the differential circuit 44, and generates the single optical pulse.

Figure 9:
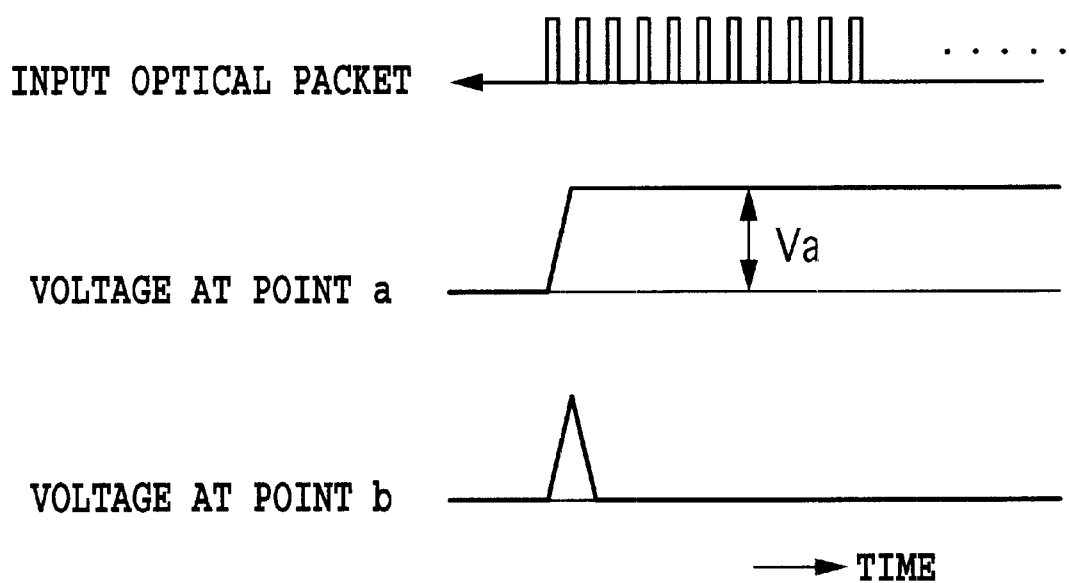
FIG. 9 is a time chart of the single pulse generator as shown in FIG. 8.

With the configuration, the capacitor 43 is charged with the optical current flowing through the photoconductive switch 42 because of the voltage Va in response to an initial optical pulse applied thereto as illustrated in the time chart in FIG. 9. Once the capacitor 43 is charged to its full, and the voltage across the photoconductive switch 42 becomes equivalent, the potential at the connecting point a between the photoconductive switch 42 and the capacitor 43 does not vary from the voltage Va in spite of subsequent incident optical pulses. The differential circuit 44 generates an electrical pulse by detecting the rising edge of the voltage Va of the capacitor 43, so that the electrical pulse drives the semiconductor laser 45. Thus, the semiconductor laser 45 is driven only by the initial optical pulse even if a plurality of optical pulses are input.

In other words, the single-optical-pulse generator 71 generates a single optical pulse when the photoconductive switch 42 is irradiated with an optical packet whose initial bit is always "1". By discharging the charge in the capacitor 43 by a discharge circuit (not shown) on a packet by packet basis, the single-optical-pulse generator 71 generates a single optical pulse every time the optical packet arrives.

The single optical pulse is incident onto the loop waveguide 81 of the optical pulse train generator 72. Although a part thereof is extracted by the optical coupler 82 to the output side, the remaining optical pulse circulates through the waveguide 81 with its loss being compensated for by the optical amplifier 84. Accordingly, adjusting the loop length of the waveguide 81 makes it possible to extract the optical control pulses with a desired period to the output side.

The saturable absorber 83 inserted in the loop waveguide 81 varies its transmittance depending on the light intensity to prevent the oscillation of the spontaneous emission light emitted from the optical amplifier 84. Using the voltage of the capacitor 43 as the control signal of the optical amplifier 84 makes it possible for the generator to generate the optical pulses as long as the optical packets continue, and to terminate the output of the optical pulses immediately when the optical packets terminate. Although the waveguide 81 made of PLC is used here, a waveguide using an optical fiber is also applicable.

Figure 10:
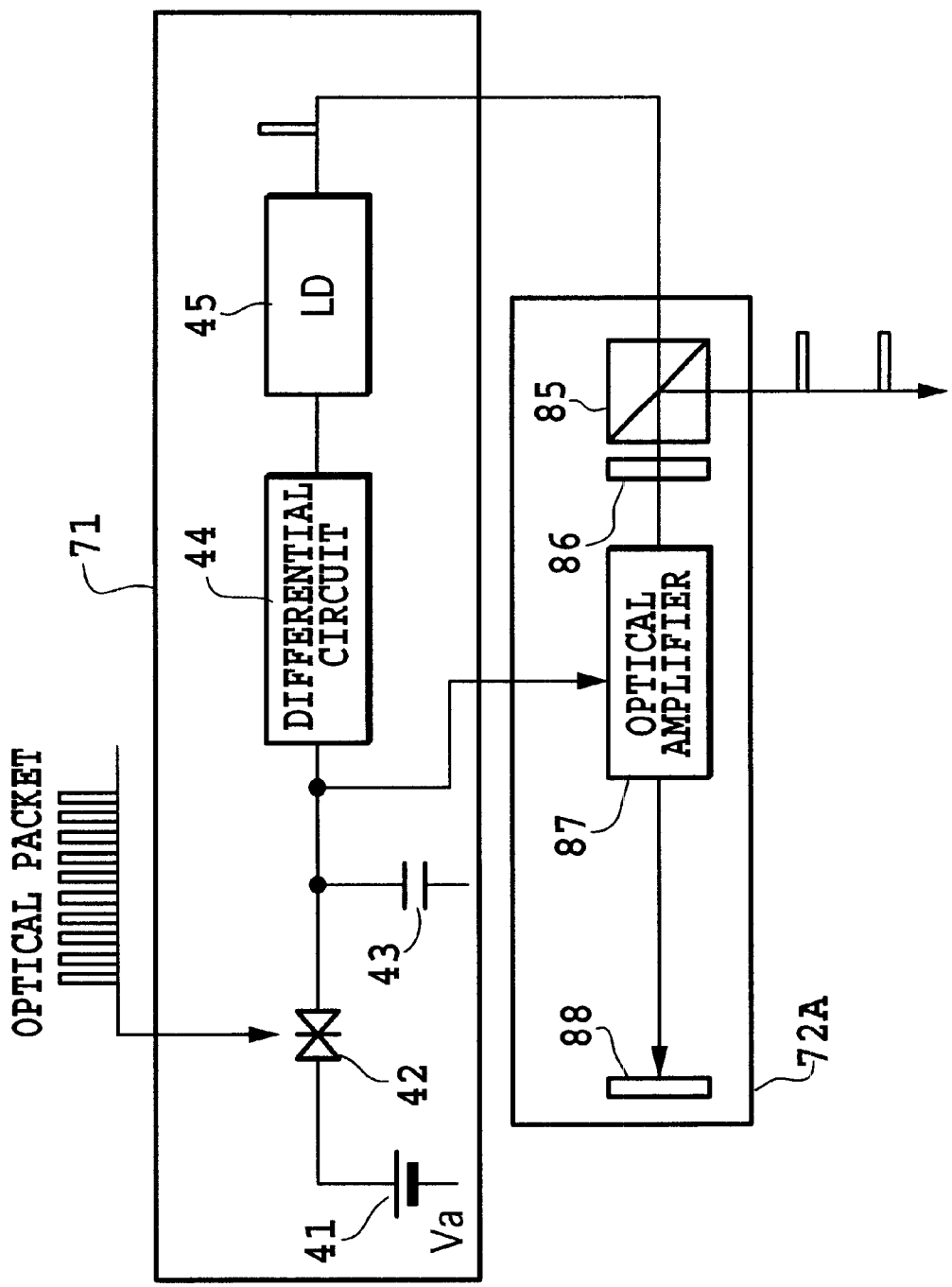
FIG. 10 is a circuit diagram showing an optical pulse generator of an embodiment in accordance with the present invention.

FIG. 10 is a block diagram showing a configuration of an optical control pulse train generator consisting of a combination of the single-optical-pulse generator 71 with an optical pulse train generator 72A with a different configuration for generating cyclic optical pulses. The optical pulse train generator 72A comprises a PBS 85, a quarter-wave plate 86, an optical amplifier 87 and a saturable absorber 88. The optical amplifier 87 is coated with an antireflection film on the left-hand side of FIG. 10, and with a reflection film of about 30% on the right-hand side. The saturable absorber 88 is coated with a high reflection film on the left-hand side of this figure.

In the optical pulse train generator 72A, the single optical pulse supplied from the single-optical-pulse generator 71 passes through the PBS 85 and quarter-wave plate 86 to be transformed into circularly polarized light which is reflected off the saturable absorber 88, passes again through the quarter-wave plate 86 to be converted into linearly polarized light whose polarization is perpendicular to that of the input optical pulse, and is reflected off the PBS 85 to be output to the outside. In the course of this, a part of the optical pulse reflected off the saturable absorber 88 is amplified again by the optical amplifier 87, is reflected off the right-hand side surface of the optical amplifier 87, and is reflected off the saturable absorber 88, again. Repeating this operation, the pulse train of the control signal can be extracted from the output side.

In the configuration of the optical pulse train generator 72A of FIG. 10, a pulse train of a desired period can be obtained by adjusting the distance between the optical amplifier 87 and the saturable absorber 88. Although the PBS 85 and the quarter-wave plate 86 function as a simple optical circulator here, other configurations can also be used in the same way as, long as they have the function of the optical circulator.

The optical pulse generator of the present embodiment can extract only the initial bit of each optical packet accurately with a very simple, compact configuration. Thus, it can generate the single optical pulse from the high-speed burst signal, which is difficult for the conventional electrical technique. In addition, the optical pulse generator of the present embodiment can operate, once the initial bits have charged the capacitor, independently of their intensity. Accordingly, even when the intensity of the input optical packets varies, the optical output pulses can maintain their intensity at a fixed value. Besides, the optical output pulses can maintain a fixed polarized state against any polarized states of the input optical packets, which is an essential condition for utilizing the optical output pulses as the control signal (or probe light beams) of the all-optical serial-to-parallel converter. To extract the clock signal from the high-speed optical packets, the conventional electrical technique requires a high-speed electronic circuit with the corresponding bandwidth. In contrast, since the optical pulse generator of the present embodiment employs the Gain-switch method of the semiconductor laser, an electrical pulse with a few hundred picoseconds is enough for driving it. In other words, as the electronic circuit of the present embodiment, a low-speed electronic circuit with a bandwidth of a few gigahertz is enough. A state-of-the-art semiconductor laser can directly generate an optical pulse with a width of 10–20 ps using the Gain-switch method, thereby making it possible to handle the optical packets at a rate of 10–40 Gbps. Furthermore, utilizing the pulse compression technique using a fiber can simply compress it to about 3 ps, which makes it possible to handle the ultrahigh-speed optical packets at a rate of 100 Gbps or more. Moreover, the configuration as shown in FIGS. 8 or 10 can generate the single optical pulse for each incoming optical packet, with making it possible to generate the optical pulse train with a desired period.

[Label Recognition Circuit]

Figure 11:
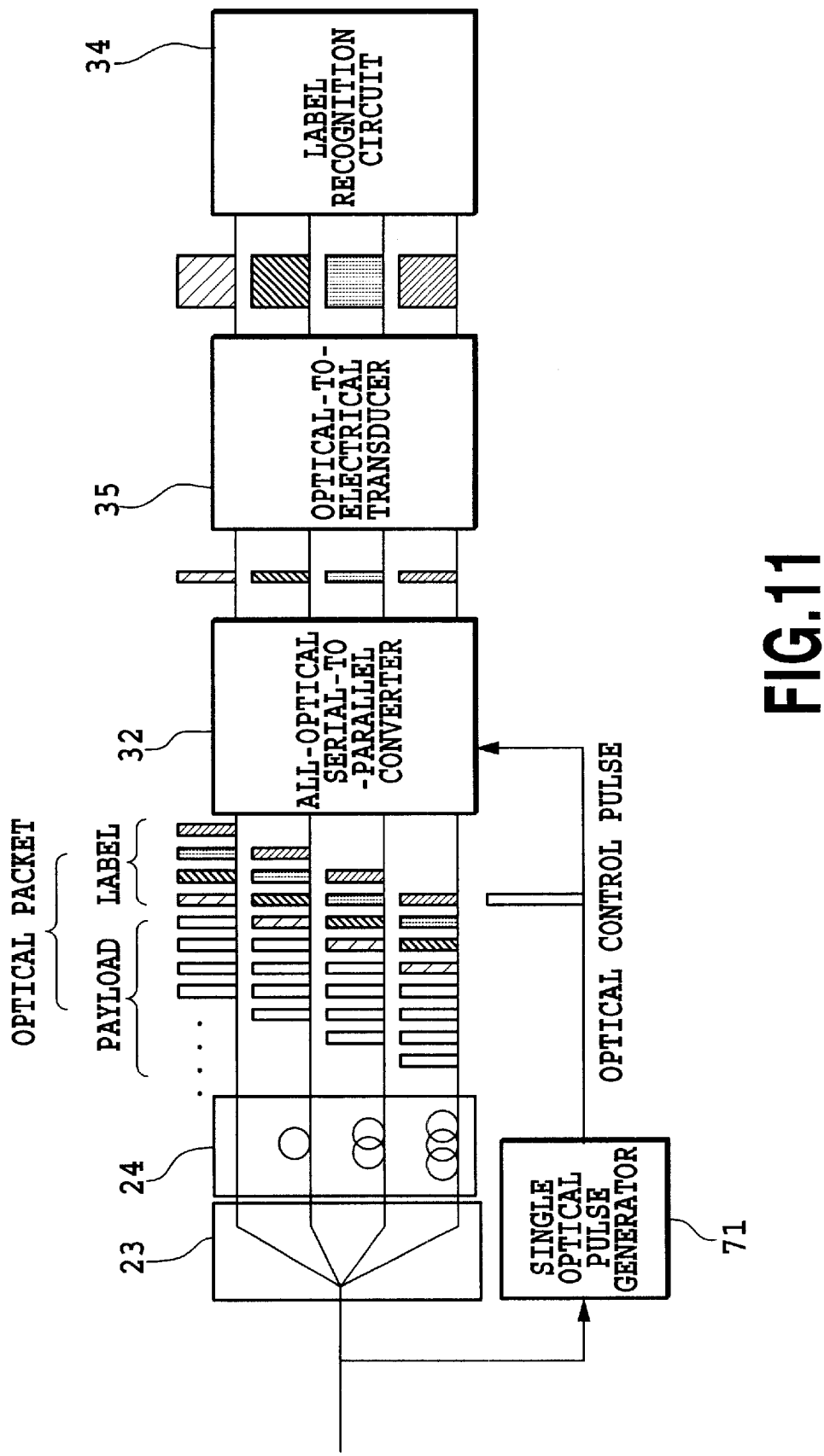
FIG. 11 is a block diagram showing a configuration of an optical signal processing apparatus of an embodiment in accordance with the present invention for carrying out the label recognition of an optical packet.

As described before in the "DESCRIPTION OF THE RELATED ART", it is necessary for a router in the optical packet communication to instantaneously read the address information contained in the label (also called "header") of a high-speed optical packet. FIG. 11 is a block diagram showing a configuration of an embodiment of the optical signal processing apparatus for processing the label information in the optical packets, which consists of a combination of the single pulse generator 71 with the all-optical serial-to-parallel converter.

In FIG. 11, an input optical packet is split to two portions, one of which is supplied to the single-optical-pulse generator 71 described in connection with FIG. 8 to generate a single optical control pulse. The optical control pulse is delivered to the all-optical serial-to-parallel converter 32 described in connection with FIGS. 2–6. The other portion of the split optical packet is split into n parts by the optical splitter 23, where n is the number of the bits of the label. The optical delay unit 24 delays the n pieces in increments of one bit and supplies them to the all-optical serial-to-parallel converter 32, and the control pulse opens the gate of the surface-normal optical switch 204 of the all-optical serial-to-parallel converter 32.

In this case, adjusting the timing of the optical control pulse output from the optical pulse generator 71 to an appropriate time enables the surface-normal optical switch 204 to be irradiated with all the pulses of the optical label simultaneously. Accordingly, opening the gate of the surface-normal optical switch 204 for a short time by the control signal allows all the optical pulses of the optical label to be output in parallel spatially. The n parallel optical pulses emitted from the all-optical serial-to-parallel converter 32 are converted into electrical signals by the optical-to-electrical transducer 33 including n low-speed photo detectors. The electrical signals are supplied to the label processing circuit 34 composed of a silicon LSI, which decodes the information about the label.

Incidentally, the following configuration can also implement the label recognition. The input optical packet is split into two portions, one of which is used for the single-optical-pulse generator 71 to generate a single optical control pulse. The single optical control pulse is passed through an optical splitter like the optical splitter 23 and an optical delay unit like the optical delay unit 24 to generate n probe beams, where n is the number of the bits of the label. Then, the n probe beams are supplied to the all-optical serial-to-parallel converter as shown in FIG. 7 together with the other one of the two split optical packet. As can be seen from FIG. 7, the configuration makes it possible to carry out the all-optical serial-to-parallel conversion of the label of the optical packet, and hence to perform the label recognition. In this case, however, since the label of the optical packet cannot be converted in parallel at once, it is unsuitable for the instantaneous read of the label information.

[Optical Memory]

Next, an embodiment of the optical memory in accordance with the present invention will be described. In the present embodiment, an optical pulse train with a period k times that of the bit period of the optical packet is generated as follows. As in the foregoing embodiments, the initial bit of the input optical packet is always set at "1". Every time the optical packet is input, the single optical pulse is generated at the same timing, and is supplied to the loop optical waveguide, thereby generating the intended optical pulse train. The optical pulse train is used to convert the input optical packet into k parallel optical signals by the all-optical serial-to-parallel conversion. The k parallel optical signals are converted by the photo detectors into k parallel electrical signals, which are written simultaneously into k memory circuits by the electronic circuit. To retrieve the optical packet from the k memory circuits, the k parallel electrical signals are read simultaneously, followed by the electric-parallel to optical-serial conversion to convert them into the optical pulse train which is output as the optical packet.

The all-optical serial-to-parallel conversion, which utilizes the transmission type or reflection type surface-normal optical switch including the semiconductor multiple quantum well layer, can achieve a very small size and low power consumption. The electric-parallel to optical-serial conversion can implement a very simple configuration as described later. Thus applying the optical components to the input/output sections, and the Si-based electronic memory circuit to the memory section makes it possible to implement a large capacity, small size, low power consumption optical memory capable of handling very high-speed burst optical signals.

Figure 12:
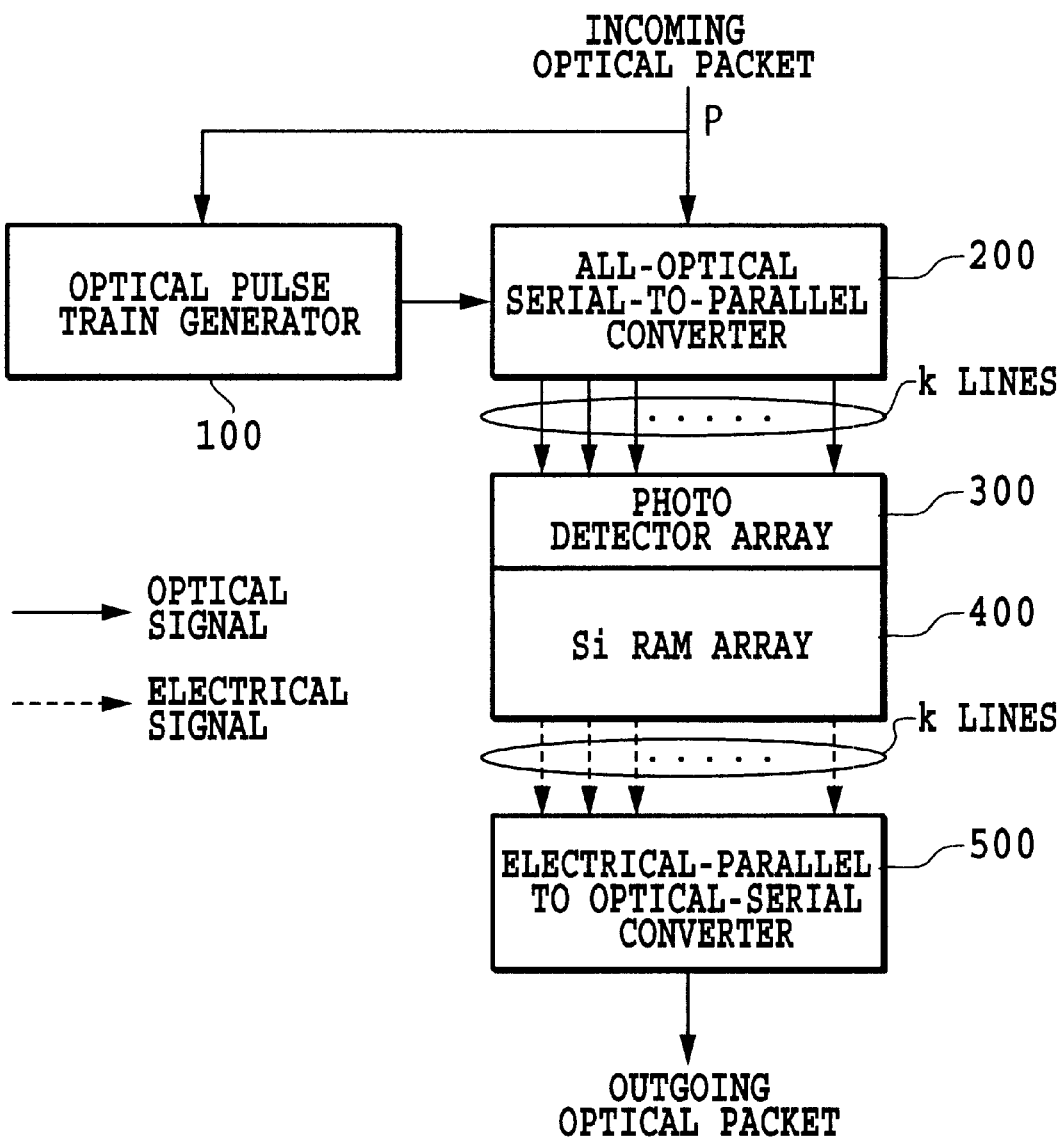
FIG. 12 is a block diagram showing a configuration of an optical random access memory device of an embodiment in accordance with the present invention.

FIG. 12 is a block diagram showing an entire configuration of an optical memory apparatus in accordance with the present invention. An input optical packet P is split into two portions by an optical splitter (not shown), one of which is supplied to the optical pulse train generator 100 described in connection with FIGS. 8 or 10. The optical pulse train generator 100 generates a low-speed optical pulse train with a period k times the bit period of the input optical packet. The optical pulse train is supplied to an all-optical serial-to-parallel converter 200 that converts the other half of the optical packet into k low-speed parallel optical pulse train signals (with a period k times the bit period of the optical packet). The parallel optical pulse train signals are output simultaneously unit by unit of k bits. The k-bit parallel optical pulse train signals are converted into electrical signals by a low-speed photo detector array 300, so that the electrical signals are stored simultaneously into k Si-based memory cell arrays 401 that use the column and row addresses in common.

Figure 13:
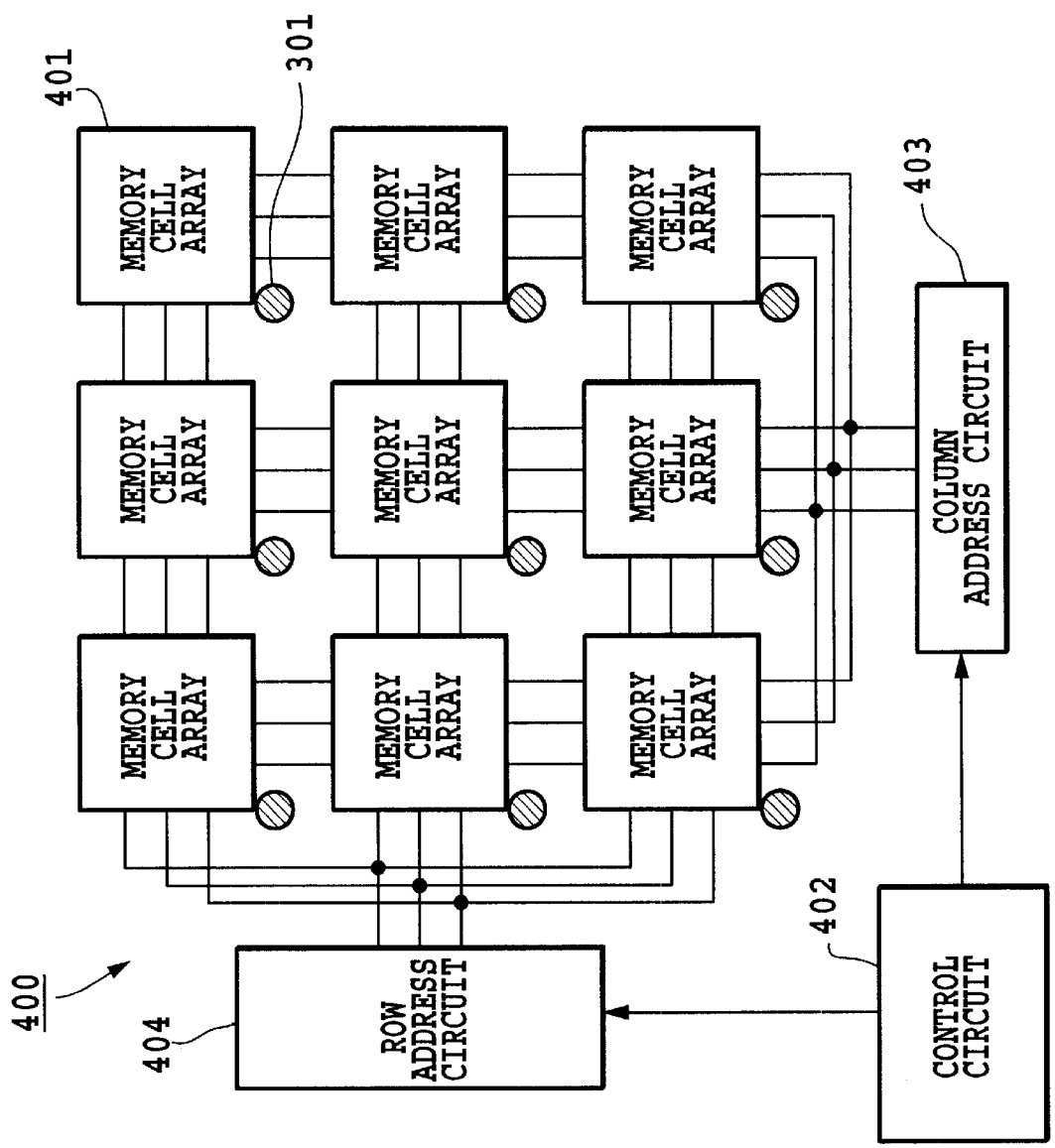
FIG. 13 is a diagram illustrating the details of an array of silicon random access memories.

As shown in FIG. 13, the Si-based memory cell array 400 comprises k memory cell arrays 401 corresponding to the k photo detectors 301 constituting the photo detector array 300, and performs writing and reading using a column address circuit 403 and a row address circuit 404 controlled by a control circuit 402. Specifically, when the two address circuits 403 and 404 designates a single address, the k data are written into the memory cell arrays 401 simultaneously. Thus, the optical pulse train generated by the optical pulse train generator 100 causes the optical packet to be converted into parallel data on a k-bit by k-bit basis as long as the optical packet continues, and the parallel data are stored into the memory cell array 400. In other words, the entire optical packet is written into the electronic memory circuit. In this case, the bit rate of the optical packet signal can be increased up to the rate k times the write rate of the memory cell arrays 401.

To read the data written into the memory cell arrays 401, every time both the address circuits 403 and 404 designate an address, k data are output simultaneously. The electrical data thus read are reconverted into a single high-speed optical packet signal by the electric-parallel to optical-serial converter 500 to be output therefrom.

Figure 14:
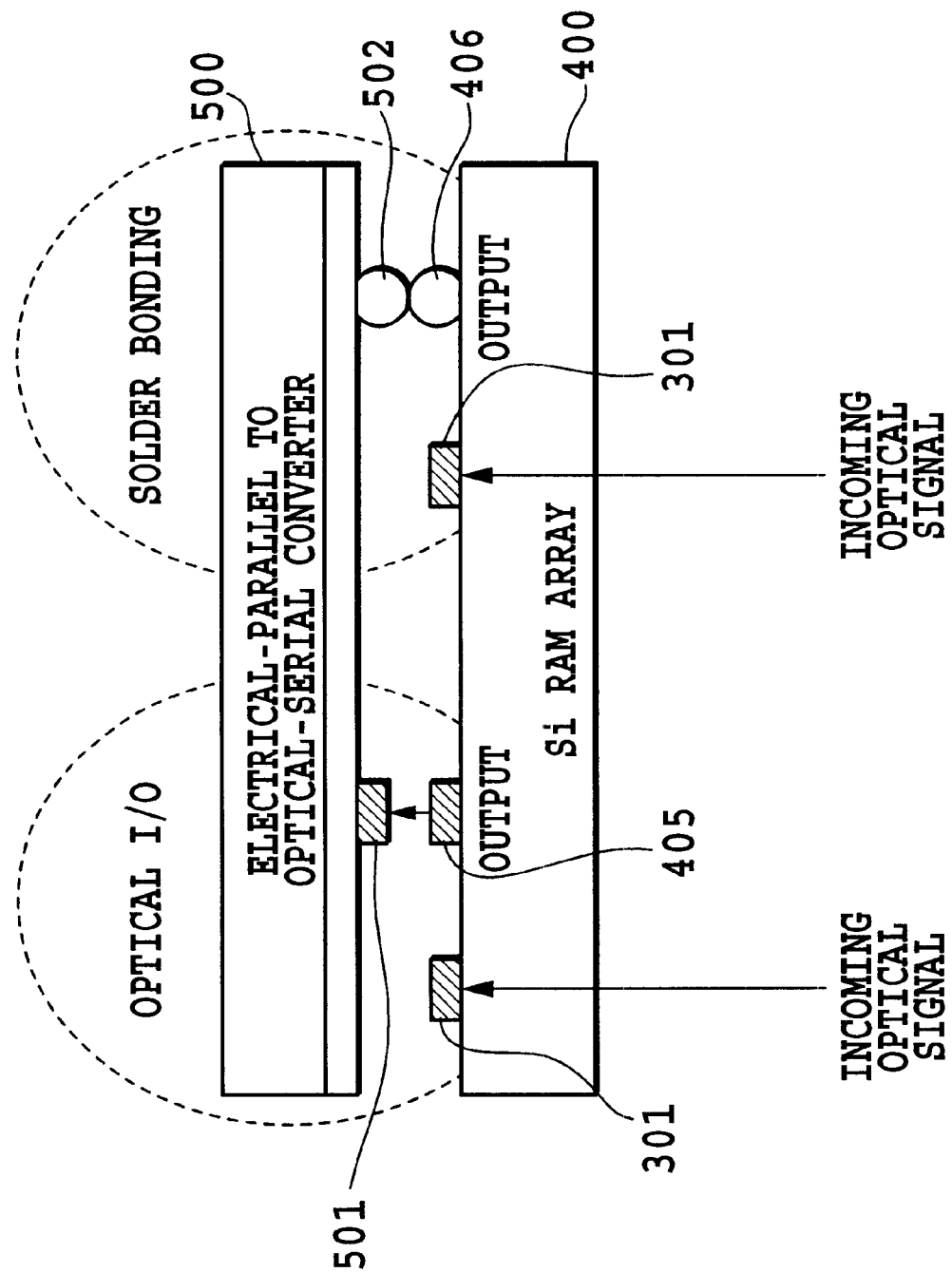
FIG. 14 is a diagram illustrating a scheme for transferring electrical data output from the array of silicon random access memories to an electrical-parallel to optical-serial converter.

As for a method of delivering the k electrical signals output from the memory cell array 400 to the electric-parallel to optical-serial converter 500, methods as shown in FIG. 14 can be employed. First, as shown in the left-hand side of FIG. 14, after converting the electrical signal into an optical signal by a surface emitting laser 405, the optical signal is reconverted into an electrical signal by a photo detector 501. This method is called an optical I/O method. Second, as shown in the right-hand side of FIG. 14, the electrical signal is delivered as it is by connecting a contact 406 with a contact 502 by the solder bonding method.

[Electric-parallel to Optical-serial Converter]

Figure 15:
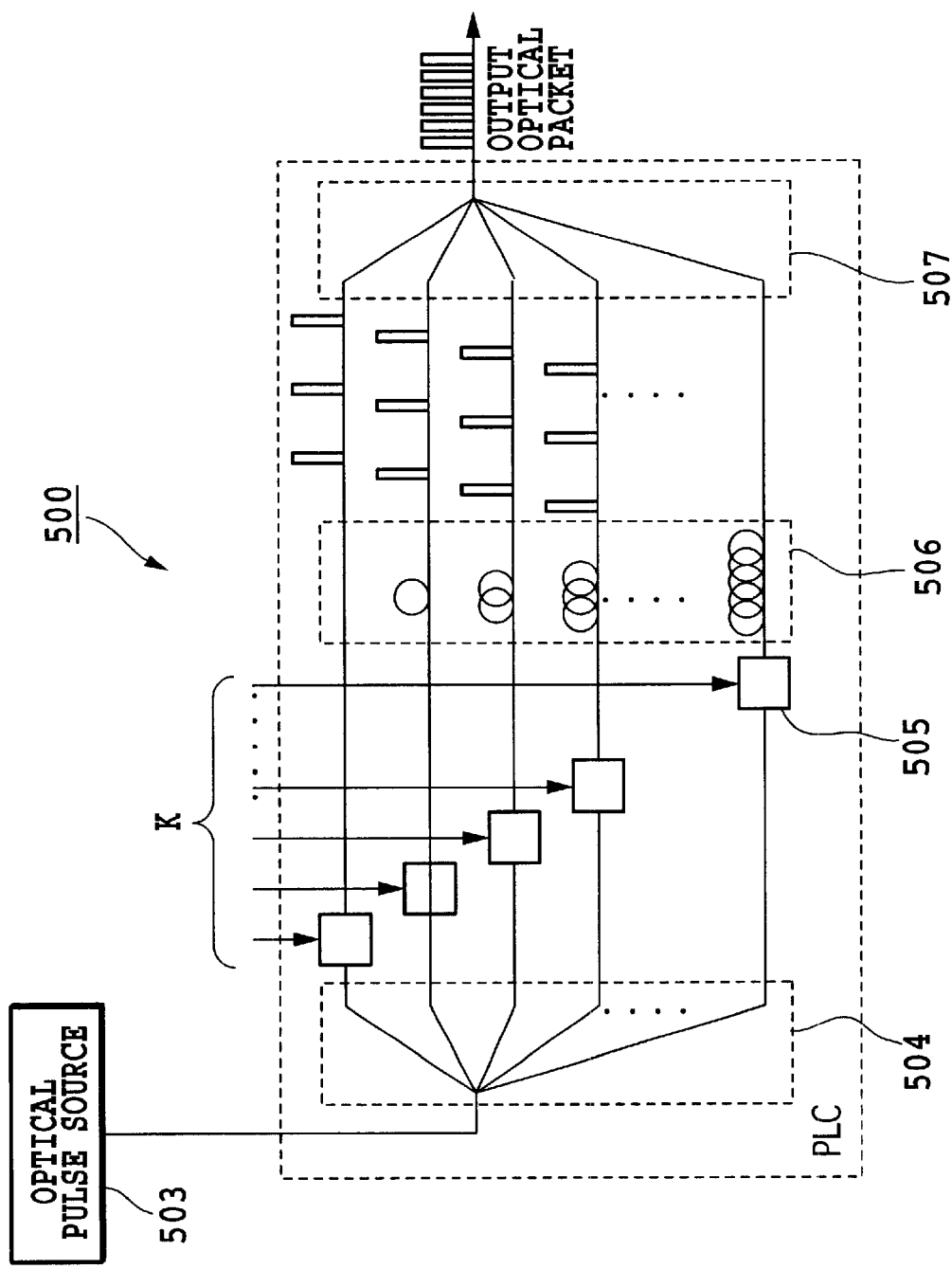
FIG. 15 is a diagram illustrating an electrical-parallel to optical-serial converter in an embodiment in accordance with the present invention.

FIG. 15 is a diagram showing a configuration of the electric-parallel to optical-serial converter 500. In FIG. 15, the reference numeral 503 designates an optical pulse source for generating an optical pulse train with a period k times the bit period of the incoming optical packet. The reference numeral 504 designates an optical splitter, 505 designates k optical modulators, 506 designates an optical delay unit, and 507 designates an optical coupler, the waveguide section of which is composed of PLC. The optical delay unit 506 may be placed between the optical splitter 504 and the optical modulators 505.

As described above, when provided with an address to read the written data, the memory cell array 400 outputs k low-speed electrical signals simultaneously from the k memory cell arrays 401 using the address in common. The k parallel electrical signals are supplied to the k optical modulators 505. On the other hand, the optical pulse from the optical pulse source 503 is split into k parts by the optical splitter 504 so that they are modulated by the k electrical signals while passing through the k optical modulators 505. The modulated optical pulses are delayed in increments of one bit by the optical delay unit 506, and combined by the coupler 507. As a result, the k low-speed parallel electrical signals are reconstructed into the original high-speed optical packet with the bit period of 1/k.

Figure 16:
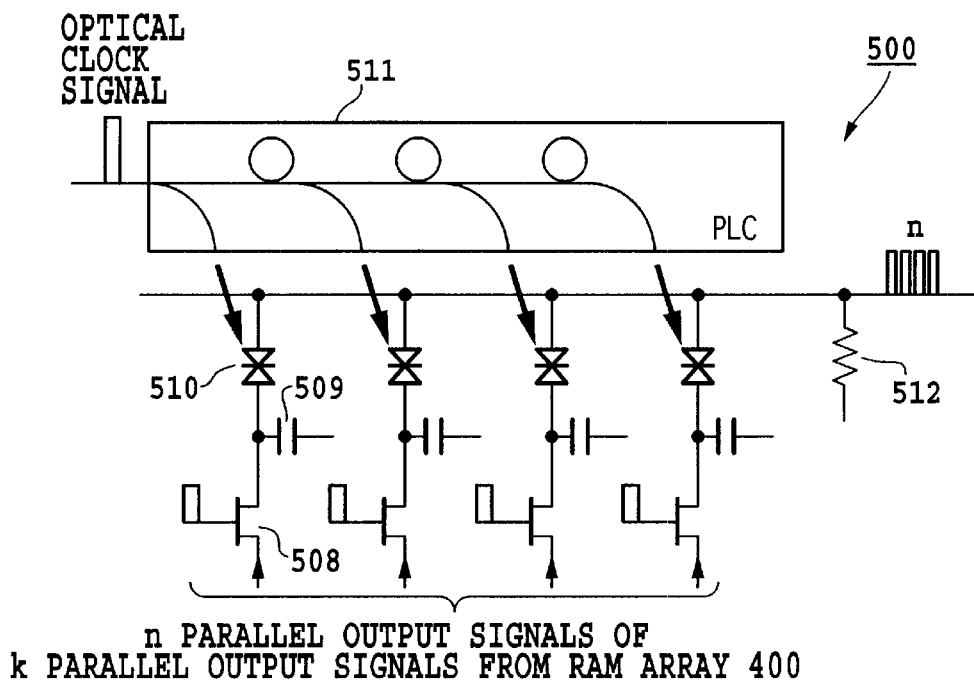
FIG. 16 is a diagram illustrating another electrical-parallel to optical-serial converter in an embodiment in accordance with the present invention.
Figure 16:
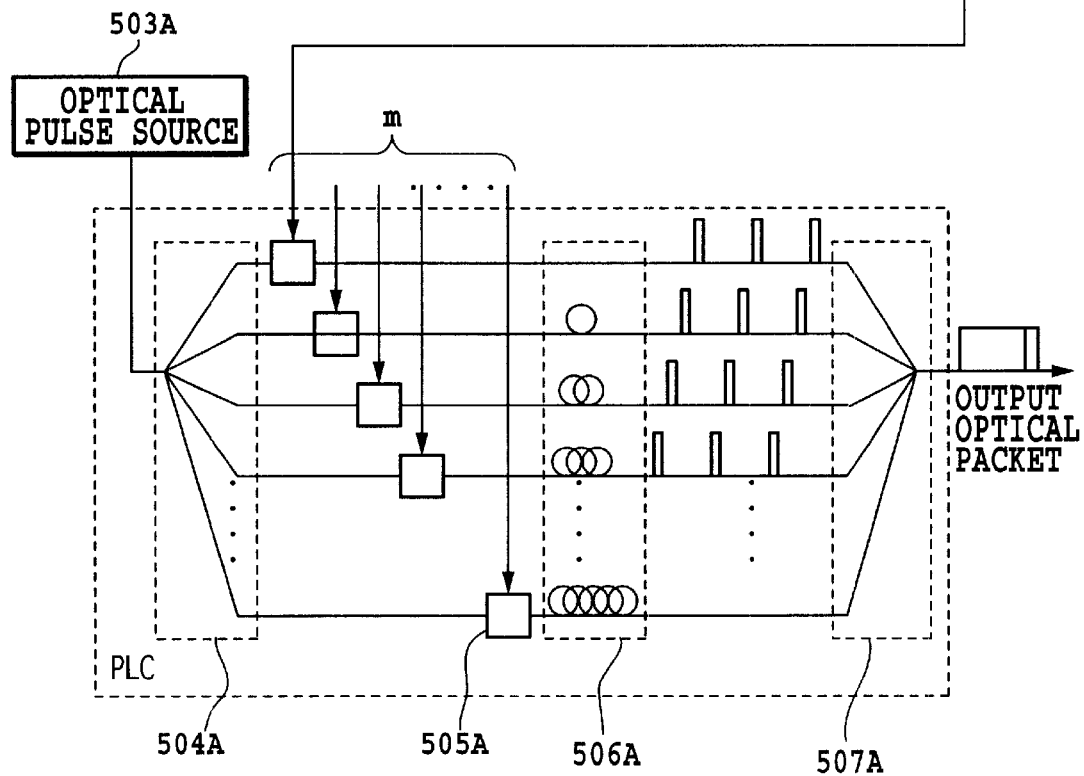
Figure 17:
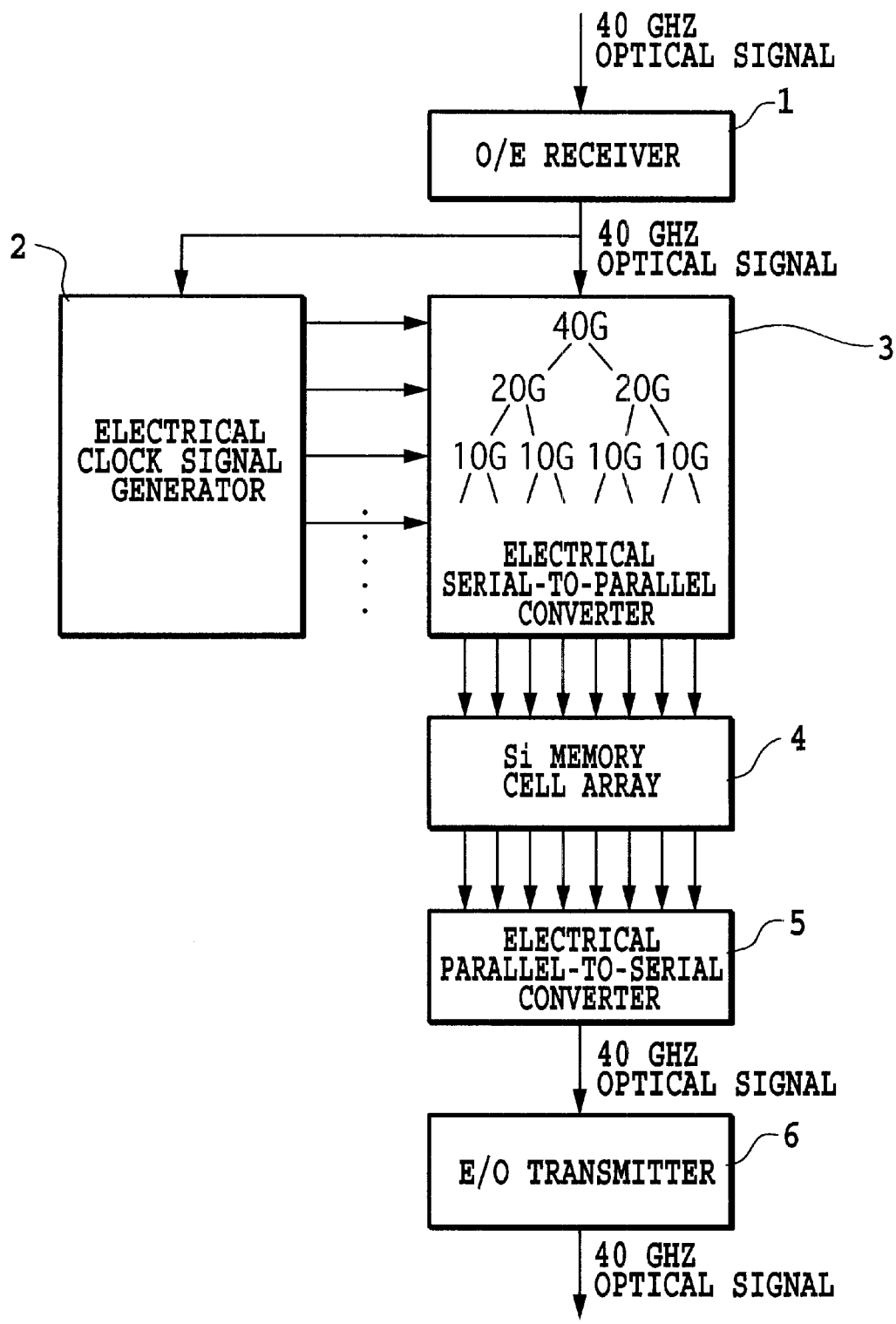
FIG. 17 is a block diagram showing a configuration of a conventional optical packet communication system.

FIG. 16 is a diagram showing another configuration of the electric-parallel to optical-serial converter 500. The electric-parallel to optical-serial converter 500 as shown in FIG. 15 requires a great number of the optical modulators when k is large.

In view of this, when k is large, the k parallel electrical signals are bound at every n signals as shown in FIG. 16 so that parallel m electrical signal sequences are created (k=n×m). Thus, m optical modulators 505A can output the original high-speed optical packet signal. Accordingly, the number of the optical modulators can be greatly reduced by a factor of n.

To bind the parallel n electrical signals into a unit, n of the k parallel electrical signals simultaneously output from the RAM array 400 are supplied to the drains of n transistors 508 as bias supply. Although one set of the n transistors 508 and their associated portions are shown in FIG. 16, m such circuits are used actually. The transistors 508 have their gate supplied with an electrical pulse so that part of the electrical signals are sampled, and capacitors 509 connected to the sources of the transistors are charged with the sampled signals. The transistors 508 and the capacitors 509 constitute sample and hold sections for sampling and holding the n electrical signals simultaneously.

On the other hand, the optical clock signal with a period of k times the bit period of the incoming optical packet is successively delayed bit by bit through an optical delay unit 511 composed of PLC or the like, so that the n photoconductive switches 510 are irradiated successively. Thus, the charges stored in the capacitors 509 are sequentially discharged and the load resistor 512 converts them into an electrical pulse train consisting of n consecutive pulses. The photoconductive switch 510, optical delay unit 511, and load resistor 512 constitute the electrical-parallel to electrical-serial conversion section.

The electrical pulse train thus obtained is supplied to one of the optical modulators 505A, in which case, the parallel k signals are modulated by the optical modulators 505A, m signals at a time, and k signal at n times. The period of the pulse train output from the optical pulse source 503A are made m times the bit period of the incoming optical packet. In this way, every k data is read sequentially until the incoming optical packet is output.

As described above, the embodiment in accordance with the present invention can implement a large capacity, small size, low power consumption optical memory that can write the high-speed, burst mode optical packet signal to the Si-based memory circuit, and that can read it freely therefrom as the high-speed optical packet.

The optical memory apparatus in accordance with the present invention can be used as an optical buffer memory for avoiding collision between the optical packets in a router. In addition, it can also be used as an optical memory apparatus for transmitting and receiving the high-speed optical packet signals in a data center that manages a large amount of data, and inputs and outputs them at any time. Furthermore, it can be used as a cache memory for transferring data instantaneously in a high-speed optical computer.

As can be seen easily from the foregoing description, the present invention serves to implement a higher order optical information processing apparatus or optical information processing system such as a high-performance router or optical computer by combining the foregoing techniques in accordance with the present invention such as the serial-to-parallel conversion, optical clock pulse generation, label processing and optical memory.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

What is claimed is:

1. An optical signal processing apparatus comprising:
   at least one optical pulse generator for generating a single optical pulse from an input optical packet or from a plurality of parallelly input optical packets;
   an all-optical serial-to-parallel converter for converting, in response to the single optical pulse, partial or entire bits of the input optical packet at once into spatially separated parallel optical signals;
   an optical-to-electrical transducer for transforming the spatially separated parallel optical signals into low-speed electrical signals; and
   a silicon-based electronic circuit for processing the electrical signals.

2. The optical signal processing apparatus as claimed in claim 1, wherein said optical pulse generator comprises:
   a dc supply;
   a capacitor;
   a photoconductive switch for charging said capacitor to its full with charges fed from said dc supply in response to reception of an initial optical pulse of the optical packet;
   a differential circuit for differentiating a voltage of said capacitor; and
   a semiconductor laser for generating a single optical pulse from an electrical pulse output from said differential circuit.

3. The optical signal processing apparatus as claimed in claim 1, wherein said all-optical serial-to-parallel converter comprises:
   an optical splitter for splitting the input optical packet signal into k parallel optical signals, where k is an integer greater than one;
   an optical delay unit for delaying the k optical signals, which are output from said optical splitter, in increments of one bit;
   a surface-normal optical transmission switch;
   a first lens for focusing the k parallel optical signals delayed in increments of one bit and the single optical pulse onto a point on said surface-normal optical transmission switch; and
   a second lens for spatially separating the k parallel optical signals passing through said surface-normal optical transmission switch.

4. The optical signal processing apparatus as claimed in claim 1, wherein said all-optical serial-to-parallel converter comprises:
   an optical splitter for splitting the input optical packet signal into k parallel optical signals, where k is an integer greater than one;
   an optical delay unit for delaying the k optical signals, which are output from said optical splitter, in increments of one bit;
   a polarizing beam splitter for causing the k parallel optical signals delayed in increments of one bit and a circularly polarized optical control pulse to pass through;
   a quarter-wave plate(s) disposed over one or two output surface(s) of said polarizing beam splitter, or said quarter-wave plate being disposed on only central part of the output surface, through which the optical control pulse passes;
   a lens for focusing light beams passing through said polarizing beam splitter and said quarter-wave plate onto one point; and
   a surface-normal optical reflection switch for receiving light focused by said lens.

5. The optical signal processing apparatus as claimed in claim 1, wherein said all-optical serial-to-parallel converter comprises:
   an optical splitter for splitting the input optical packet signal into k×L parallel optical signals, where L is one or plurality;
   an optical delay unit for delaying the k×L parallel optical signals, which are output from said optical splitter, in increments of one bit;
   an optical splitter for splitting an optical control pulse consisting of the single optical pulse into L optical signals;
   (k+1)×L optical waveguides for causing the k×L parallel optical signals, which are split by said optical splitter and delayed by said optical delay unit, and the L optical control pulses to pass through;
   a lens array composed of k+1 lenses for converting the optical signals output from said optical waveguides into parallel optical beams;
   a polarizing beam splitter for causing the parallel optical signals and the circularly polarized optical control pulses to pass through;
   a quarter-wave plate(s) disposed over one or two output surface(s) of said polarizing beam splitter, or said quarter-wave plate being disposed on only central part of the output surface through which the optical control pulses pass;
   a lens for focusing light beams passing through said polarizing beam splitter and said quarter-wave plate;
   a surface-normal optical reflection switch for receiving light focused by said lens; and
   a lens array composed of k+1 lenses for separately focusing the optical beams reflected off the surface-normal optical reflection switch and output from said polarizing beam splitter.

6. The optical signal processing apparatus as claimed in claim 1, wherein said all-optical serial-to-parallel converter comprises:

L optical splitters, each for splitting one of L parallelly input optical packet signals into k parallel optical signals, where L is one or plurality;

L optical delay units, each for delaying k parallel optical signals, which are output from one of said optical splitters, in increments of one bit;

an optical splitter for splitting an optical control pulse consisting of the single optical pulse into L optical signals;

(k+1)×L optical waveguides for causing the k×L parallel optical signals, which are split by said L optical splitters and delayed by said optical delay units, and the L optical control pulses to pass through;

a lens array composed of k+1 lenses for converting the optical signals output from said optical waveguides into parallel optical beams;

a polarizing beam splitter for causing the parallel optical signals and the circularly polarized optical control pulses to pass through;

a quarter-wave plate(s) disposed over one or two output surface (s) of said polarizing beam splitter, or said quarter-wave plate being disposed on only central part of the output surface through which the optical control pulses pass;

a lens for focusing light beams passing through said polarizing beam splitter and said quarter-wave plate;

a surface-normal optical reflection switch for receiving light focused by said lens; and a lens array composed of k+1 lenses for separately focusing the optical beams reflected off the surface-normal optical reflection switch and output from said polarizing beam splitter.

7. The optical signal processing apparatus as claimed in claim 1, wherein said electronic circuit consists of a label recognition circuit for recognizing optical label information in the optical packet signal, and then said optical signal processing apparatus is used as the optical label processing apparatus.

8. The optical signal processing apparatus as claimed in claim 7, wherein said optical pulse generator comprises:

a dc supply;

a capacitor;

a photoconductive switch for charging said capacitor to its full with charges fed from said dc supply in response to reception of an initial optical pulse of the optical packet;

a differential circuit for differentiating a voltage of said capacitor; and a semiconductor laser for generating a single optical pulse from an electrical pulse output from said differential circuit.

9. The optical signal processing apparatus as claimed in claim 7, wherein said all-optical serial-to-parallel converter comprises:

an optical splitter for splitting the input optical packet signal into k parallel optical signals, where k is a number of bits of the label;

an optical delay unit for delaying the k optical signals, which are output from said optical splitter, in increments of one bit;

a surface-normal optical transmission switch;

a first lens for focusing the k parallel optical signals delayed in increments of one bit and the single optical pulse onto a point on said surface-normal optical transmission switch; and a second lens for spatially separating the k parallel optical signals passing through said surface-normal optical transmission switch.

10. The optical signal processing apparatus as claimed in claim 7, wherein said all-optical serial-to-parallel converter comprises:

an optical splitter for splitting the input optical packet signal into k parallel optical signals, where k is a number of bits of the label;

an optical de-lay unit for delaying the k optical signals, which are output from said optical splitter, in increments of one bit;

a polarizing beam splitter for causing the k parallel optical signals delayed in increments of one bit and a circularly polarized optical control pulse to pass through;

a quarter-wave plate(s) disposed over one or two output surface(s) of said polarizing beam splitter, or said quarter-wave plate being disposed on only central part of the output surface through which the optical control pulse passes;

a lens for focusing light beams passing through said polarizing beam splitter and said quarter-wave plate onto one point; and a surface-normal optical reflection switch for receiving light focused by said lens.

11. The optical signal processing apparatus as claimed in claim 7, wherein said all-optical serial-to-parallel converter comprises:

an optical splitter for splitting the input optical packet signal into k×L parallel optical signals, where k×L is a number of bits of the label;

an optical delay unit for delaying the k×L parallel optical signals, which are output from said optical splitter, in increments of one bit;

an optical splitter for splitting an optical control pulse consisting of the single optical pulse into L optical signals;

(k+1)×L optical waveguides for causing the k×L parallel optical signals, which are split by said optical splitter and delayed by said optical delay unit, and the L optical control pulses to pass through;

a lens array composed of k+1 lenses for converting the optical signals output from said optical waveguides into parallel optical beams;

a polarizing beam splitter for causing the parallel optical signals and the circularly polarized optical control pulses to pass through;

a quarter-wave plate(s) disposed over one or two surface(s) of said polarizing beam splitter, or said quarter-wave plate being disposed on only central part of the output surface through which the optical control pulses pass;

a lens for focusing light beams passing through said polarizing beam splitter and said quarter-wave plate;

a surface-normal optical reflection switch for receiving light focused by said lens; and a lens array composed of k+1 lenses for separately focusing the optical beams reflected off the surface-normal optical reflection switch and output from said polarizing beam splitter.

12. The optical signal processing apparatus as claimed in claim 7, wherein said all-optical serial-to-parallel converter comprises:

L optical splitters, each for splitting one of L parallelly input optical packet signals into k parallel optical signals, where k is a number of bits of the label;

L optical delay units, each for delaying k parallel optical signals, which are output from one of said optical splitters, in increments of one bit;

an optical splitter for splitting an optical control pulse consisting of the single optical pulse into L optical signals;

(k+1)×L optical waveguides for causing the k×L parallel optical signals, which are split by said L optical splitters and delayed by said optical delay units, and the L optical control pulses to pass through;

a lens array composed of k+1 lenses for converting the optical signals output from said optical waveguides into parallel optical beams;

a polarizing beam splitter for causing the parallel optical signals and the circularly polarized optical control pulses to pass through;

a quarter-wave plate(s) disposed over one or two output surface(s) of said polarizing beam splitter, or said quarter-wave plate being disposed on only central part of the output surface through which the optical control pulses pass;

a lens for focusing light beams passing through said polarizing beam splitter and said quarter-wave plate;

a surface-normal optical reflection switch for receiving light focused by said lens; and a lens array composed of k+1 lenses for separately focusing the optical beams reflected off the surface-normal optical reflection switch and output from said polarizing beam splitter.

13. The optical signal processing apparatus as claimed in any one of claims 7 to 12, wherein said optical label processing apparatus is employed in a router.

14. An optical signal processing apparatus comprising:
at least one optical pulse generator for generating a low repetition optical pulse train from an input optical signal stream or from each of a plurality of parallelly input optical signal streams;

an all-optical serial-to-parallel converter for converting, in response to the optical pulse train, each predetermined number of bits of the input optical signal stream iteratively into spatially separated parallel optical signals;

an optical-to-electrical transducer for transforming the spatially separated parallel optical signals into low-speed parallel electrical signals; and a silicon-based electronic circuit for processing the parallel electrical signals.

15. The optical signal processing apparatus as claimed in claim 14, wherein the input optical signal stream consists of an optical packet signal, and wherein said optical pulse generator comprises:
a dc supply;
a capacitor;
a photoconductive switch for charging said capacitor to its full with charges fed from said dc supply in response to reception of an initial optical pulse of the input optical packet;
a differential circuit for differentiating a voltage of said capacitor;
a semiconductor laser for generating a single optical pulse from an electrical pulse output from said differential circuit;
a loop waveguide that receives the single optical pulse output from said semiconductor laser;
a saturable absorber and an optical amplifier inserted into said waveguide; and
a photo coupler for extracting an optical pulse train from said waveguide.

16. The optical signal processing apparatus as claimed in claim 14, wherein said all-optical serial-to-parallel converter comprises:
an optical splitter for splitting the input optical signal stream into k parallel optical signals, where k is an integer greater than one;
an optical delay unit for delaying the k optical signals, which are output from said optical splitter, in increments of one bit;
a surface-normal optical transmission switch;
a first lens for focusing the k parallel optical signals delayed in increments of one bit and the optical pulse train onto a point on said surface-normal optical transmission switch; and
a second lens for spatially separating the k parallel optical signals passing through said surface-normal optical transmission switch.

17. The optical signal processing apparatus as claimed in claim 14, wherein said all-optical serial-to-parallel converter comprises:
an optical splitter for splitting the input optical signal stream into k parallel optical signals, where k is an integer greater than one;
an optical delay unit for delaying the k optical signals, which are output from said optical splitter, in increments of one bit;
a polarizing beam splitter for causing the k parallel optical signals delayed in increments of one bit and a circularly polarized optical control pulse to pass through;
a quarter-wave plate(s) disposed over one or two output surface(s) of said polarizing beam splitter, or said quarter-wave plate being disposed on only central part of the output surface through which the optical control pulse passes;
a lens for focusing light beams passing through said polarizing beam splitter and said quarter-wave plate onto one point; and
a surface-normal optical reflection switch for receiving light focused by said lens.

18. The optical signal processing apparatus as claimed in claim 14, wherein said all-optical serial-to-parallel converter comprises:
an optical splitter for splitting the input optical packet signal into k×L parallel optical signals, where L is one or plurality;
an optical delay unit for delaying the k×L parallel optical signals, which are output from said optical splitter, in increments of one bit;
an optical splitter for splitting an optical control pulse consisting of the optical pulse train into L optical signals;
(k+1)×L optical waveguides for causing the k×L parallel optical signals, which are split by said optical splitter and delayed by said optical delay unit, and the L optical control pulses to pass through;
a lens array composed of k+1 lenses for converting the optical signals output from said optical waveguides into parallel optical beams;
a polarizing beam splitter for causing the k parallel optical signals, which are delayed in increments of one bit, and the circularly polarized optical control pulses to pass through;

a quarter-wave plate(s) disposed over one or two output surface(s) of said polarizing beam splitter, or said quarter-wave plate being disposed on only central part of the output surface through which the optical control pulses pass;

a lens for focusing light beams passing through said polarizing beam splitter and said quarter-wave plate;

a surface-normal optical reflection switch for receiving light focused by said lens; and a lens array composed of k+1 lenses for separately focusing the optical beams reflected off the surface-normal optical reflection switch and output from said polarizing beam splitter.

19. The optical signal processing apparatus as claimed in claim 14, wherein said all-optical serial-to-parallel converter comprises:

L optical splitters, each for splitting one of L parallelly input optical packet signals into k parallel optical signals, where L is one or plurality;

L optical delay units, each for delaying k parallel optical signals, which are output from one of said optical splitters, in increments of one bit;

an optical splitter for splitting an optical control pulse consisting of the optical pulse train into L optical signals;

(k+1)×L optical waveguides for causing the k×L parallel optical signals, which are split by said L+1 optical splitters and delayed by said optical delay units, and the L optical control pulses to pass through;

a lens array composed of k+1 lenses for converting the optical signals output from said optical waveguides into parallel optical beams;

a polarizing beam splitter for causing the parallel optical signals and the circularly polarized optical control pulses to pass through;

a quarter-wave plate(s) disposed over one or two output surface(s) of said polarizing beam splitter, or said quarter-wave plate being disposed on only central part of the output surface through which the optical control pulses pass;

a lens for focusing light beams passing through said polarizing beam splitter and said quarter-wave plate;

a surface-normal optical reflection switch for receiving light focused by said lens; and a lens array composed of k+1 lenses for separately focusing the optical beams reflected off the surface-normal optical reflection switch and output from said polarizing beam splitter.

20. The optical signal processing apparatus as claimed in claim 14, wherein said electronic circuit includes a label recognition circuit for recognizing a label of the input optical signal stream, and wherein said optical signal processing apparatus constitutes in its entirety an optical memory apparatus that writes a high-speed optical packet signal into an electronic memory cell array.

21. The optical signal processing apparatus as claimed in claim 20, wherein said optical pulse generator comprises:

a dc supply;

a capacitor;

a photoconductive switch for charging said capacitor to its full with charges fed from said dc supply in response to reception of an initial optical pulse of the input optical packet;

a differential circuit for differentiating a voltage of said capacitor;

a semiconductor laser for generating a single optical pulse from an electrical pulse output from said differential circuit;

a loop waveguide that receives the single optical pulse output from said semiconductor laser;

a saturable absorber and an optical amplifier inserted into said waveguide; and a photo coupler for extracting an optical pulse train from said waveguide.

22. The optical signal processing apparatus as claimed in claim 20, wherein said all-optical serial-to-parallel converter comprises:

an optical splitter for splitting the input optical packet signal into k parallel optical signals, where k is an integer greater than one;

an optical delay unit for delaying the k optical signals, which are output from said optical splitter, in increments of one bit;

a polarizing beam splitter for causing the k parallel optical signals delayed in increments of one bit and a circularly polarized optical control pulse to pass through;

a quarter-wave plate(s) disposed over one or two output surface(s) of said polarizing beam splitter, or said quarter-wave plate being disposed on only central part of the output surface through which the optical control pulse passes;

a lens for focusing light beams passing through said polarizing beam splitter and said quarter-wave plate onto one point, and a surface-normal optical reflection switch for receiving light focused by said lens.

23. The optical signal processing apparatus as claimed in claim 20, wherein said all-optical serial-to-parallel converter comprises:

an optical splitter for splitting the input optical packet signal into k×L parallel optical signals, where L is one or plurality;

an optical delay unit for delaying the k×L parallel optical signals, which are output from said optical splitter, in increments of one bit;

an optical splitter for splitting an optical control pulse consisting of the optical pulse train into L optical signals;

(k+1)×L optical waveguides for causing the k×L parallel optical signals, which are split by said optical splitter and delayed by said optical delay unit, and the L optical control pulses to pass through;

a lens array composed of k+1 lenses for converting the optical signals output from said optical waveguides into parallel optical beams;

a polarizing beam splitter for causing the k parallel optical signals, which are delayed in increments of one bit, and the circularly polarized optical control pulses to pass through;

a quarter-wave plate(s) disposed over one or two output surface(s) of said polarizing beam splitter, or said quarter-wave plate being disposed on only central part of the output surface through which the optical control pulses pass;

a lens for focusing light beams passing through said polarizing beam splitter and said quarter-wave plate;

a surface-normal optical reflection switch for receiving light focused by said lens; and a lens array composed of k+1 lenses for separately focusing the optical beams reflected off the surface-normal optical reflection switch and output from said polarizing beam splitter.

24. The optical signal processing apparatus as claimed in claim 20, wherein said all-optical serial-to-parallel converter comprises:
- L optical splitters, each for splitting one of L parallelly input optical packet signals into k parallel optical signals, where L is one or plurality;
- L optical delay units, each for delaying k parallel optical signals, which are output from one of said optical splitters, in increments of one bit;
- an optical splitter for splitting an optical control pulse consisting of the optical pulse train into L optical signals;
- (k+1)×L optical waveguides for causing the k×L parallel optical signals, which are split by said L+1 optical splitters and delayed by said optical delay units, and the L optical control pulses to pass through;
- a lens array composed of k+1 lenses for converting the optical signals output from said optical waveguides into parallel optical beams;
- a polarizing beam splitter for causing the parallel optical signals and the circularly polarized optical control pulses to pass through;
- a quarter-wave plate(s) disposed over one or two output surface(s) of said polarizing beam splitter, or said quarter-wave plate being disposed on only central part of the output surface through which the optical control pulses pass;
- a lens for focusing light beams passing through said polarizing beam splitter and said quarter-wave plate;
- a surface-normal optical reflection switch for receiving light focused by said lens; and
- a lens array composed of k+1 lenses for separately focusing the optical beams reflected off the surface-normal optical reflection switch and output from said polarizing beam splitter.

25. An optical memory apparatus comprising: a
- an optical pulse generator for generating a low repetition optical pulse train from an input optical packet;
- an all-optical serial-to-parallel converter for iteratively converting, in response to the optical pulse train, the input optical packet into spatially parallel optical signals on a k-bit by k-bit basis, where k is an integer greater than one;
- k optical-to-electrical transducers for transforming the spatially parallel optical signals into low-speed parallel electrical signals;
- an electronic memory cell array for storing the parallel electrical signals; and
- an electrical-parallel to optical-serial converter for reconstructing a serial optical packet signal from k parallel electrical signals read from said electronic memory cell array.

26. The optical memory apparatus as claimed in claim 25, wherein said optical pulse generator comprises:
- a dc supply;
- a capacitor;
- a photoconductive switch for charging said capacitor to its full with charges fed from said dc supply in response to reception of an initial optical pulse of the input optical packet;
- a differential circuit for differentiating a voltage of said capacitor;
- a semiconductor laser for generating a single optical pulse from an electrical pulse output from said differential circuit;
- a loop waveguide that receives the single optical pulse output from said semiconductor laser;
- a saturable absorber and an optical amplifier inserted into said waveguide; and
- a photo coupler for extracting an optical pulse train from said waveguide.

27. The optical memory apparatus as claimed in claim 25, wherein said all-optical serial-to-parallel converter comprises:
- an optical splitter for splitting the input optical packet signal into k parallel optical signals, where k is an integer greater than one;
- an optical delay unit for delaying the k optical signals, which are output from said optical splitter, in increments of one bit;
- a polarizing beam splitter for causing the k parallel optical signals delayed in increments of one bit and a circularly polarized optical control pulse consisting of the optical pulse train to pass through;
- a quarter-wave plate(s) disposed over one or two output surface(s) of said polarizing beam splitter, or said quarter-wave plate being disposed on only central part of the output surface through which the optical control pulse passes;
- a lens for focusing light beams passing through said polarizing beam splitter and said quarter-wave plate onto one point; and
- a surface-normal optical reflection switch for receiving light focused by said lens.

28. The optical memory apparatus as claimed in claim 25, wherein said all-optical serial-to-parallel converter comprises:
- an optical splitter for splitting the input optical packet signal into k×L parallel optical signals, where L is one or plurality;
- an optical delay unit for delaying the k×L parallel optical signals, which are output from said optical splitter, in increments of one bit;
- an optical splitter for splitting an optical control pulse consisting of the optical pulse train into L optical signals;
- (k+1)×L optical waveguides for causing the k×L parallel optical signals, which are split by said optical splitter and delayed by said optical delay unit, and the L optical control pulses to pass through;
- a lens array composed of k+1 lenses for converting the optical signals output from said optical waveguides into parallel optical beams;
- a polarizing beam splitter for causing the k parallel optical signals, which are delayed in increments of one bit, and the circularly polarized optical control pulses to pass through;
- a quarter-wave plate(s) disposed over one or two output surface(s) of said polarizing beam splitter, or said quarter-wave plate being disposed on only central part of the output surface through which the optical control pulses pass;
- a lens for focusing light beams passing through said polarizing beam splitter and said quarter-wave plate;
- a surface-normal optical reflection switch for receiving light focused by said lens; and a lens array composed of k+1 lenses for separately focusing the optical beams reflected off the surface-normal optical reflection switch and output from said polarizing beam splitter.

29. The optical memory apparatus as claimed in claim 25, wherein said all-optical serial-to-parallel converter comprises:

L optical splitters, each for splitting one of L parallelly input optical packet signals into k parallel optical signals, where L is one or plurality;

L optical delay units, each for delaying k parallel optical signals, which are output from one of said optical splitters, in increments of one bit;

an optical splitter for splitting an optical control pulse consisting of the optical pulse train into L optical signals;

(k+1)×L optical waveguides for causing the k×L parallel optical signals, which are split by said L+1 optical splitters and delayed by said optical delay units, and the L optical control pulses to pass through;

a lens array composed of k+1 lenses for converting the optical signals output from said optical waveguides into parallel optical beams;

a polarizing beam splitter for causing the parallel optical signals and the circularly polarized optical control pulses to pass through;

a quarter-wave plate(s) disposed over one or two output surface(s) of said polarizing beam splitter, or said quarter-wave plate being disposed on only central part of the output surface through which the optical control pulses pass;

a lens for focusing light beams passing through said polarizing beam splitter and said quarter-wave plate;

a surface-normal optical reflection switch for receiving light focused by said lens; and a lens array composed of k+1 lenses for separately focusing the optical beams reflected off the surface-normal optical reflection switch and output from said polarizing beam splitter.

30. The optical memory apparatus as claimed in claim 25, wherein said electric-parallel to optical-serial converter comprising:

m sample and hold sections for successively sampling n signals of k parallel electrical signals read from k random access memories corresponding said electronic memory cell array, where m=k/n;

m all-electronic parallel-to-serial converters, each for extracting a unit consisting of n sampled and stored data as an electrical pulse train;

an optical pulse source;

an optical splitter for splitting an optical signal output from said optical pulse source into m optical signals;

m optical modulators, each for modulating one of m parallel optical signals output from said optical splitter by one of m parallel electrical signals output from said m electrical-parallel to electrical-serial conversion sections;

an optical delay unit for delaying the m parallel optical signals in increments of one bit at an input side or output side of said m optical modulators; and a coupler for combining m delayed parallel optical signals into one optical pulse train to generate the optical packet signal.

31. The optical memory apparatus as claimed in any one of claims 25–30, wherein said optical memory apparatus is applied to a router.

32. An optical signal processing method for carrying out signal processing of a high-speed optical packet, said optical signal processing method comprising the steps of:

splitting one input optical packet signal or each of L parallelly input optical packet signals into two, where L is one or plurality;

generating a single optical pulse using an initial bit of one of the two splitted optical packet signals;

converting the other splitted optical packet in part or in its entirety into k parallel optical signals using the single optical pulse;

converting the k or k×L parallel optical signals into k or k×L low-speed parallel electrical signals by a low-speed optical-to-electrical transducer; and supplying the parallel electrical signals to a silicon-based electronic circuit.

33. The optical signal processing method as claimed in claim 32, wherein the step of converting one of the two splitted optical packet signals into the k parallel optical signals comprising the substeps of:

irradiating a point of a surface-normal optical switch with the single optical pulse to modulate transmittance or reflectance at the point;

splitting the other splitted optical packet into k parts, delaying their phases in increments of one bit, and irradiating a same point on the surface-normal optical switch with the k optical packets; and converting optical pulses of a label of the optical packet in part or in their entirety into parallel signals by causing the surface-normal optical switch to transmit or reflect only optical pulses in the optical packet that are incident onto the surface-normal optical switch at a same timing as the single optical pulse, and wherein the parallel optical pulses are transformed into low-speed parallel electrical signals by the low-speed optical-to-electrical transducer, and information about the label is read by a silicon-based label recognition circuit.

34. An optical random access memory method comprising the steps of:

splitting an input optical packet signal into two;

generating an optical pulse train with a period k times a period of the optical packet signal using one of the two splitted optical packet signals;

converting the other splitted optical packet signal into the k parallel optical signals using the optical pulse train;

converting the k parallel optical signals into k parallel electrical signals;

writing the k parallel electrical signals into a k electronic memory cell arrays composed of electronic circuits; and converting the k parallel electrical signals, which are read from the k electronic memory cell arrays simultaneously, into a single optical pulse train, and outputting it as the optical packet signal.

35. The optical random access memory method as claimed in claim 34, wherein the step of converting one of the two splitted optical packet signals into the k parallel optical signals comprising the substeps of:

irradiating a point on a surface-normal optical switch with the optical pulse train generated from the optical packet to modulate transmittance or reflectance at the point;

splitting the other splitted optical packet into k parts, delaying their phases in increments of one bit, and irradiating a same point on the surface-normal optical switch with the k optical packets; and converting the optical packet into parallel signals on a k-bit by k-bit basis by causing the surface-normal optical switch to transmit or reflect only optical pulses in the optical packet that are incident onto the surface-normal optical switch at a same timing as the optical pulse train, and wherein the parallel optical pulses are transformed into low-speed parallel electrical signals by the low-speed optical-to-electrical transducer to be written into a silicon-based electron memory array.

* * * * *

UNITED STATES PATENT AND TRADEMARK OFFICE
CERTIFICATE OF CORRECTION

PATENT NO.    : 6,535,661 B2
DATED         : March 18, 2003
INVENTOR(S)   : Takahashi et al.

It is certified that error appears in the above-identified patent and that said Letters Patent is hereby corrected as shown below:

Column 19,
Line 22, delete the word "surface (s)" and insert the word -- surfaces(s) --

Column 20,
Line 10, delete the word "de-lay" and insert the word -- delay --.

Column 24,
Line 30, delete comma "," and insert the semicolon -- ; --.

Signed and Sealed this

First Day of July, 2003

JAMES E. ROGAN
*Director of the United States Patent and Trademark Office*